(12) United States Patent
Nakao et al.

(10) Patent No.: US 8,243,322 B2
(45) Date of Patent: Aug. 14, 2012

(54) IMAGE DATA PROCESSOR AND IMAGE DATA PROCESSING PROGRAM STORAGE MEDIUM FOR VARIABLE PRINTING

(75) Inventors: Mitsuru Nakao, Kanagawa (JP); Nobuyuki Shitara, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 556 days.

(21) Appl. No.: 12/539,742

(22) Filed: Aug. 12, 2009

(65) Prior Publication Data

US 2010/0060935 A1    Mar. 11, 2010

(30) Foreign Application Priority Data

Sep. 11, 2008  (JP) ................................. 2008-233341

(51) Int. Cl.
*G06K 15/00* (2006.01)

(52) U.S. Cl. ..................... 358/1.18; 358/1.13; 358/1.15; 382/232; 382/244; 382/246; 345/555; 708/203; 709/247

(58) Field of Classification Search .................. 358/1.18, 358/1.13, 1.15; 382/232, 244, 246; 345/555; 708/203; 709/247

See application file for complete search history.

(56) References Cited

U.S. PATENT DOCUMENTS

| | | | | |
|---|---|---|---|---|
| 2003/0189724 A1* | 10/2003 | Kloosterman et al. | ....... | 358/1.18 |
| 2010/0060936 A1* | 3/2010 | Shitara et al. | ................ | 358/1.18 |
| 2010/0296118 A1* | 11/2010 | Nakao et al. | ................ | 358/1.15 |

FOREIGN PATENT DOCUMENTS

JP    2005-167537    6/2005

* cited by examiner

*Primary Examiner* — Jacky X Zheng

(74) *Attorney, Agent, or Firm* — Young & Thompson

(57) ABSTRACT

The image data processor generates storage layout information and output joint information, and then generates a page raster for storage based on the storage layout information and a page raster for output based on the output joint information. The storage layout information is based on layout information describing object layouts and includes a page formed by the same objects and reusable objects of the same arrangements and a page formed by each variable object. The output joint information combines a page for reusable objects and a page for the variable object.

20 Claims, 22 Drawing Sheets

FIG. 2

| OBJECT ID | X-POSITION | Y-POSITION | REUSABLE |
|---|---|---|---|
| FIRST-PAGE LAYOUT | | | |
| 3 | X03 | Y03 | ○ |
| 2 | X02 | Y02 | ○ |
| 1 | X01 | Y01 | ○ |
| 8 | X08 | Y08 | × |
| SECOND-PAGE LAYOUT | | | |
| 4 | X04 | Y04 | ○ |
| 5 | X05 | Y05 | ○ |
| 9 | X09 | Y09 | × |
| 10 | X10 | Y10 | × |
| 6 | X06 | Y06 | ○ |
| 7 | X07 | Y07 | ○ |

| OBJECT ID | X-POSITION | Y-POSITION | REUSABLE |
|---|---|---|---|
| THIRD-PAGE LAYOUT | | | |
| 3 | X03 | Y03 | ○ |
| 2 | X02 | Y02 | ○ |
| 1 | X01 | Y01 | ○ |
| 11 | X08 | Y08 | × |
| M-TH(EVEN NUMBER)PAGE LAYOUT | | | |
| 4 | X04 | Y04 | ○ |
| 5 | X05 | Y05 | ○ |
| N | X09 | Y09 | × |
| N+1 | X10 | Y10 | × |
| 6 | X06 | Y06 | ○ |
| 7 | X07 | Y07 | ○ |

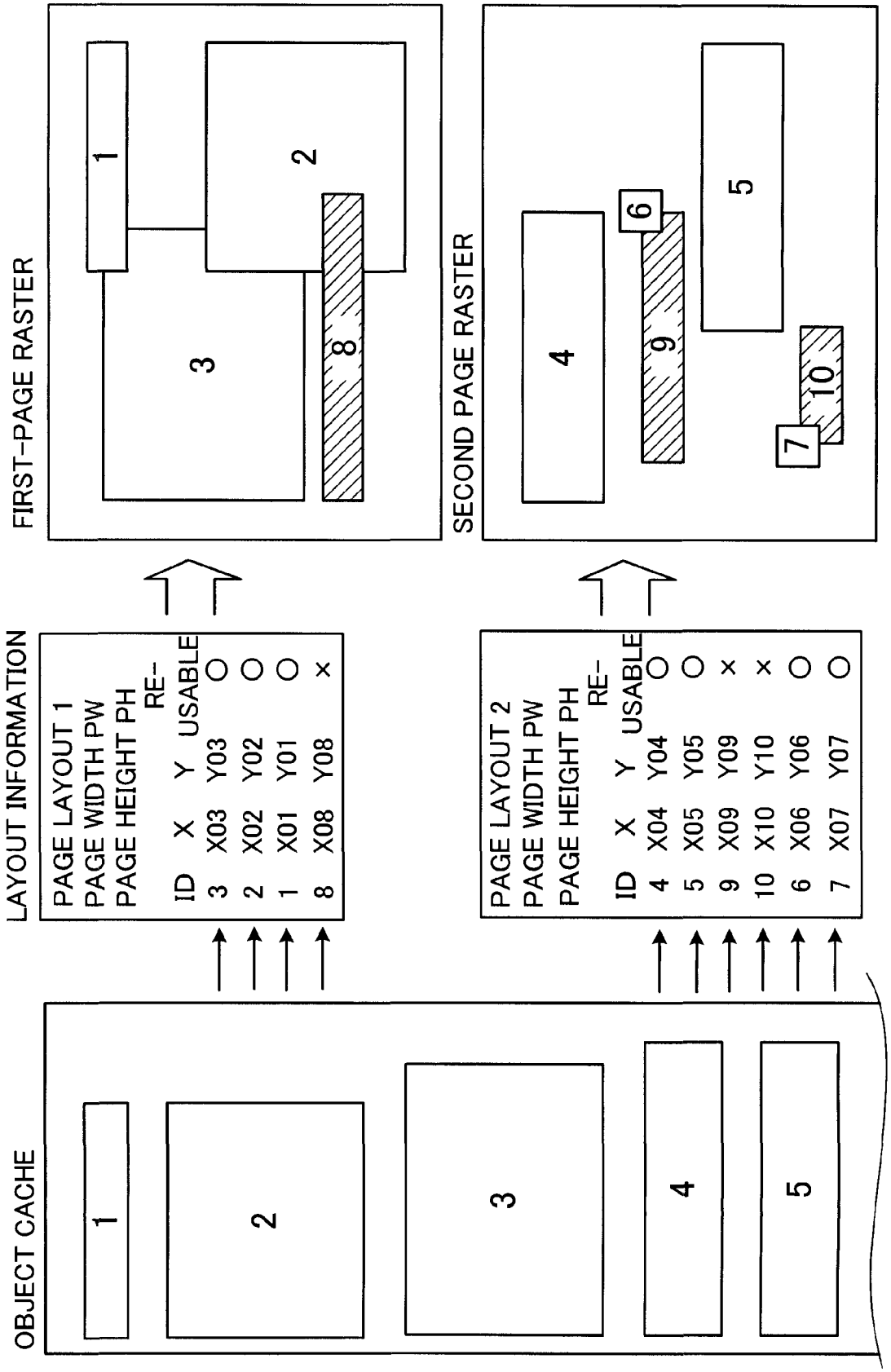

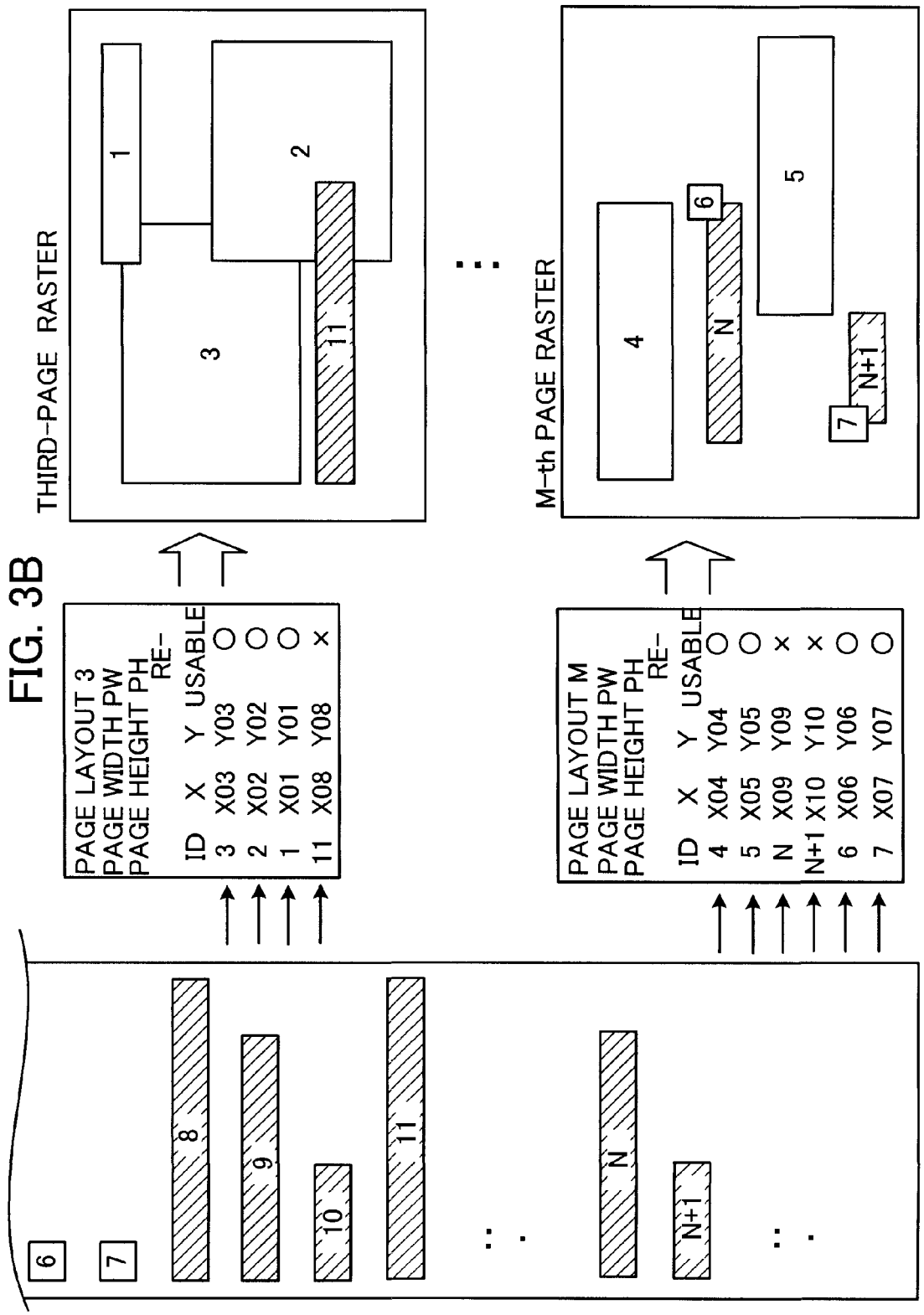

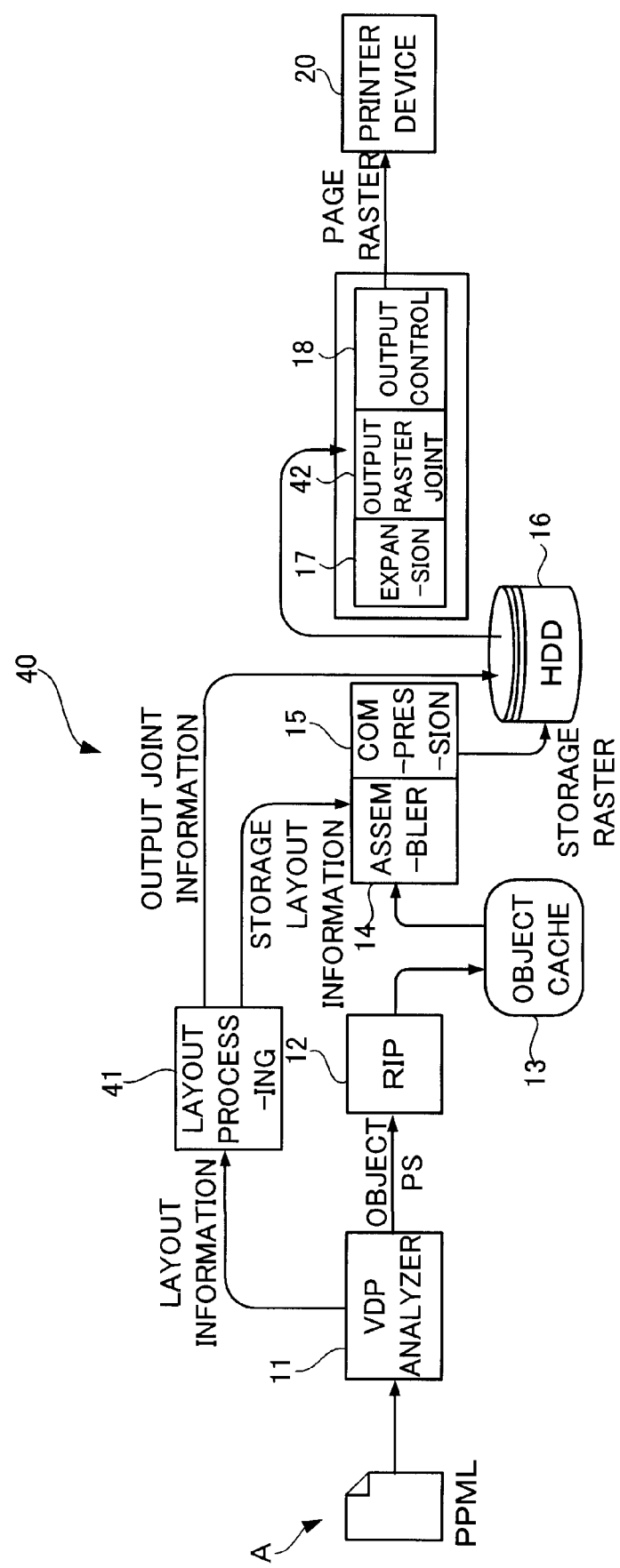

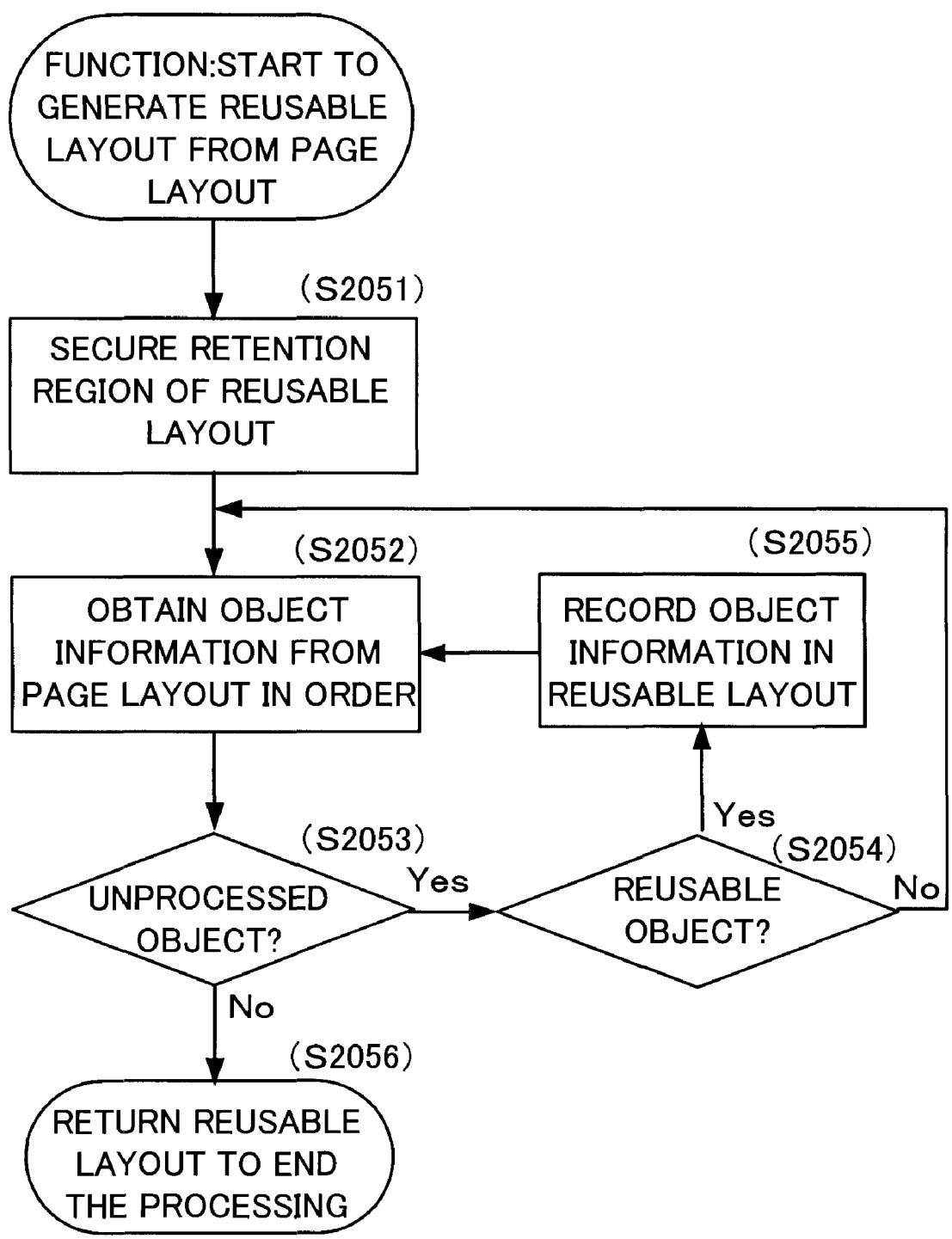

IMAGE DATA PROCESSOR AND IMAGE DATA PROCESSING PROGRAM STORAGE MEDIUM FOR VARIABLE PRINTING

BACKGROUND OF THE INVENTION

1. Field of the Invention

The present invention relates to an image data processor for generating a page raster that is image data rasterized by each page based on page description data described in page description language for variable printing and an image data processing program storage medium storing an image data processing program that causes an information processing apparatus to operate as the image data processor.

2. Description of the Related Art

For example, there have been variable printing in which a variable object that is an image object used only once on a particular page is combined with a reusable object that is an image object used repeatedly over plural pages. One application of the variable printing is, for example, an advertisement addressed to a different individual name but contents of which is almost the same, for example, formed by picture patterns.

As variable printing has large data volume due to its abundant variation in printing, how to decrease data amount, speed up processing and suppress the amount of data storage capacity is a problem.

Here, there has been proposed a technique for decreasing the storage raster amount by paying attention to correlation between pages in variable printing (see Japanese Patent Application Publication No. 2005-167537).

Japanese Patent Application Publication No. 2005-167537 has proposed the following feature to solve the above problem.

Generally in variable printing, reusable objects are arranged on the most areas of a page, and a variable object is arranged on a small area of the page. Thus, each page has a similar construction Here, similar pages are extracted to form one group. Image for one page in the group is referred to as a reference image. Pixel difference between other pages in the group and the reference image is calculated. The most regions of the differential image are white pixels and thus compressed effectively with a high compression ratio. This can reduce total storage capacity.

However, the feature of this technique lies in that, at the time of data production, differential operation for two images is performed over the entire page and compression operation for differential image having the page size is performed. In addition, at the time of using the data (at printing), expansion operation is performed for the differential image having the page size. Subsequently, addition operation similar to differential operation is performed for two images over the entire page. As these operations require high load processing, Japanese Patent Application Publication No. 2005-1675 has provided an exclusive hardware for these operations.

It may be said that the technique disclosed in Japanese Patent Application Publication No. 2005-167537 is slow processing and requires high cost for speeding up processing.

SUMMARY OF THE INVENTION

The present invention has been made in view of the above circumstances and provides an image data processor and an image data processing program storage medium that are capable of performing high-speed processing at low cost in a variable printing as well as decrease storage capacity.

According to a first aspect of the invention, an image data processor includes:

a data analyzing section that receives information specifying a reusable object that is an image object used repeatedly over a plurality of pages, information specifying a variable object that is an image object used once on a particular page, and page description data in page description language describing arrangement positions of image objects by each page formed by the reusable object and the variable object, and that generates object data having image objects specified by the page description data, and layout information having arrangement positions by each page of the image objects specified by the page description data;

a rasterizing section that receives the object data generated in the data analyzing section and rasterizes each image object in the object data, thereby generates an object raster that is object data in a rasterized format of each image object;

a layout processing section that generates, based on the layout information generated in the data analyzing section, a storage page layout for reusable objects for one page by a group of a page where same reusable objects are arranged respectively on same positions, the storage page layout for reusable objects describing IDs of the reusable objects to be arranged on the page and arrangement positions of the reusable objects, generates a storage page layout for each variable object describing an ID of the variable object and an ID of an image object overlapping the variable object at least partially, and a manner in which the image object overlaps the variable object, and thereby generates storage layout information formed by all storage page layouts including the storage page layout for reusable objects and the storage page layout for the variable object, and further generates, for each output page for printing, output page joint information describing an ID of a storage page layout for reusable objects forming the output page, an ID of a storage page layout for the variable object forming the output page, and an arrangement position of the variable object on the output page specified by the storage page layout for the variable object, thereby generating output joint information formed by output page joint information for all the output pages;

an assembling section that assembles each object raster generated in the rasterizing section, based on the storage layout information generated in the layout processing section, by each storage page layout forming the storage layout information, thereby generating a storage page raster representing a rasterized image by each storage page specified by each storage page layout; and an output raster joint section that joints storage page rasters generated in the assembling section, based on the output joint information by each output page joint information forming the output joint information, thereby generating an output page raster representing a rasterized image by each output page specified by each output page joint information.

The feature of the image data processor according to the present invention lies in that a page raster for storage and a page raster for output are separately provided. Specifically, the layout processing section is provided for generating storage layout information and output joint information. Based on the storage layout information, a page raster for storage is generated and the page raster is joined based on the output joint information to generate a page raster for output. This enables high speed processing at low cost and decreased storage capacity.

Preferably, the image data processor according to the present invention further includes a data compression section that performs compression processing to a storage page raster generated in the assembling section; and a data expansion section that performs expansion processing to the compressed storage page raster.

The above feature enables significant reduction in storage capacity.

The image data processor according to the present invention may further include a data output section that outputs the output page raster generated in the output raster joint section to a printer that prints a visual image based on the output page raster.

With this feature, it is possible to output page raster generated in the image data processor of the present invention directly to a printer.

In the image data processor according to the present invention, it is preferable that when the layout processing section generates a storage page layout for reusable objects for one page by the group based on the layout information generated in the data analyzing section, the layout processing section generates a storage page layout for reusable objects representing arrangement positions of the reusable objects on a storage page having the same size as the page forming the group. Also, it is preferable that the layout processing section generates for each variable object, based on the layout information generated in the data analyzing section, a storage page layout for the variable object representing an arrangement position of an image object that overlaps the variable object at least partially on the storage page having the same size as each variable object.

In generating an output page raster for one page, only single storage page layout is required for reusable objects while plural storage page layouts may be required for variable objects. Thus, it is effective to form a storage page layout for reusable objects having the same size as the original page and to form a storage page layout for an variable object having the size of the variable object.

According to a second aspect of the invention, an image data processing program storage medium storing an image data processing program, which is executed an information processing apparatus and causes the information processing apparatus to operate as an image data processor, the image data processor including:

a data analyzing section that receives information specifying a reusable object that is an image object used repeatedly over a plurality of pages, information specifying a variable object that is an image object used once on a particular page, and page description data in page description language describing arrangement positions of image objects by each page formed by the reusable object and the variable object, and that generates object data having image objects specified by the page description data, and layout information having arrangement positions by each page of the image objects specified by the page description data;

a rasterizing section that receives the object data generated in the data analyzing section and rasterizes each image object in the object data, thereby generates an object raster that is object data in a rasterized format of each image object;

a layout processing section that generates, based on the layout information generated in the data analyzing section, a storage page layout for reusable objects for one page by a group of a page where same reusable objects are arranged respectively on same positions, the storage page layout for reusable objects describing IDs of the reusable objects to be arranged on the page and arrangement positions of the reusable objects, generates a storage page layout for each variable object describing an ID of the variable object and an ID of an image object overlapping the variable object at least partially, and a manner in which the image object overlaps the variable object, and thereby generates storage layout information formed by all storage page layouts including the storage page layout for reusable objects and the storage page layout for the variable object, and further generates, for each output page for printing, output page joint information describing an ID of a storage page layout for reusable objects forming the output page, an ID of a storage page layout for the variable object forming the output page, and an arrangement position of the variable object on the output page specified by the storage page layout for the variable object, thereby generating output joint information formed by output page joint information for all the output pages;

an assembling section that assembles each object raster generated in the rasterizing section, based on the storage layout information generated in the layout processing section, by each storage page layout forming the storage layout information, thereby generating a storage page raster representing a rasterized image by each storage page specified by each storage page layout; and an output raster joint section that joints storage page rasters generated in the assembling section based on the output joint information by each output page joint information forming the output joint information, thereby generating an output page raster representing a rasterized image by each output page specified by each output page joint information.

Preferably, the image data processing program stored in the medium further causing the information processing apparatus to include: a data compression section that performs compression processing to a storage page raster generated in the assembling section; and a data expansion section that performs expansion processing to the compressed storage page raster.

It is also preferable that the image data processing program stored in the medium further causing the information processing apparatus to include a data output section that outputs the output page raster generated in the output raster joint section to a printer that prints a visual image based on the output page raster.

Further, it is preferable that when the layout processing section generates a storage page layout for reusable objects for one page by the group based on the layout information generated in the data analyzing section, the layout processing section generates a storage page layout for reusable objects representing arrangement positions of the reusable objects on a storage page having the same size as the page forming the group.

It is also preferable that the layout processing section generates for each variable object, based on the layout information generated in the data analyzing section, a storage page layout for the variable object representing an arrangement position of an image object that overlaps the variable object at least partially on the storage page having the same size as each variable object.

As described above, the present invention enables high-speed processing at low cost in variable printing and reduction in storage capacity.

BRIEF DESCRIPTION OF DRAWINGS

FIG. 2 indicates a sample of layout information generated in a VDP analyzer;

FIG. 3 is a drawing indicating a concept when a page raster is generated by merging object rasters based on the sample layout information indicated in FIG. 2;

FIG. 7 is a functional block diagram of an image data processor realized in an information processing apparatus when the image data processing program indicated in FIG. 6 is executed in the information processing apparatus;

FIG. 11 is a flowchart indicating a processing for generating a reusable layout from a page layout;

DETAILED DESCRIPTION OF THE INVENTION

At first, variable printing processing in the conventional raster merging method under the POD (Print On Demand) print system is briefly described, followed by description of variable printing processing according to the present invention.

Figure 1:
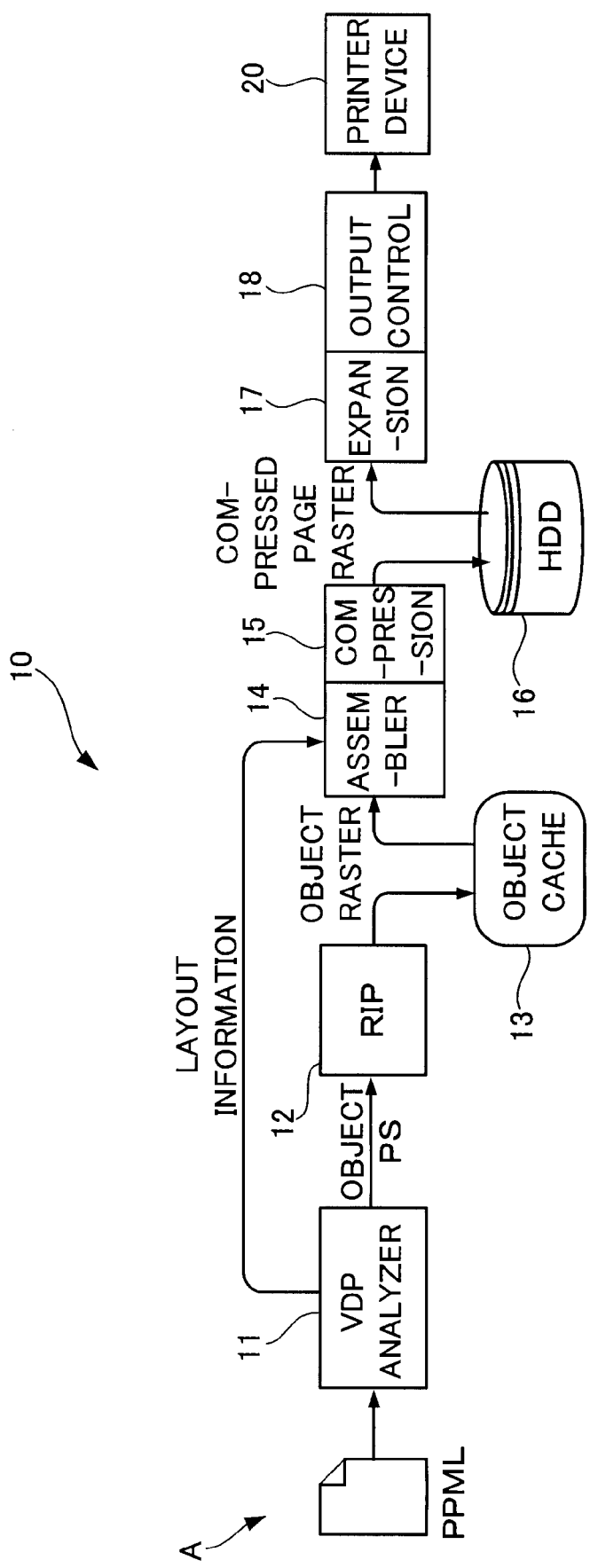
FIG. 1 is a functional block diagram of a conventional image data processor that performs variable print processing.

FIG. 1 is a functional block diagram of a conventional image data processor that performs variable print processing. This type of image data processor has a function realized by combination of the hardware of an information processing apparatus such as a computer and a conventional image data processing program when the conventional image data processing program is executed in the image processing apparatus.

When PPML data A that is described in page description language called as PPML for describing variable printing is input to an image data processor 10, the PPML data A is analyzed in a VDP analyzer 11 at first, to generate layout information and an object PS (PostScript).

The layout information describes where in the output page area an object specified by an object ID should be arranged. It is a list of object IDs to be arranged and their arrangement positions by each page.

In addition, the object PS is the one generated as a single postscript file by gathering objects that are included or referred to externally in the PPML.

The object PS generated in the VDP analyzer 11 is input to a RIP (Raster Image Processor) 12 where the object PS is rendered (rasterised) and an object raster that is an image object in a rasterized form is generated. This object raster is once saved in an object cache 13.

In addition, the layout information generated in the VDP analyzer 11 is referred to by an assembler 14. This assembler 14 retrieves from the object cache 13 an object raster specified by an object ID according to the layout information description and merges the retrieved object raster at a specified position on an output page area. The concept of this "merge" will be described later. Merging of the object raster generates a page raster representing image data for one page of image data in rasterized format. The page raster is compressed in a compression section 15, and saved in a nonvolatile memory section (for example, HDD) 16.

When image is printed, the page raster in the compressed form is retrieved from the nonvolatile memory section 16 and expanded in an expansion section 17. The expanded page raster is sent to a printer device 20 by an output control section 18. In the printer device 20, printing is performed based on the page raster which has been sent.

Incidentally, details of the VDP analyzer 11 and the RIP 12 are disclosed in Japanese Patent Application Publication No. 2005-210395.

FIG. 2 indicates a sample of layout information generated in the VDP analyzer 11. Hereafter, descriptions will be made, referring to this sample.

In the sample indicated in FIG. 2, flag information is described showing whether each object indicated by an object ID is a reusable object (○) or a variable object (X). The flag is used as one of parameters to specify an object in the processing for retrieving an object raster from the object cache 13.

The sample indicated in FIG. 2 has the following construction.

The object IDs 1-7 are reusable objects, and other objects 8 or larger are variable objects. The IDs of the variable objects are arranged in the ascending order on an output page where the variable objects are arranged.

Odd number pages (page 1 and page 3 in this sample) are formed by reusable objects (ID=1, 2, 3) and one variable object. Even number pages (page 2 and page 4 in this sample) are formed by reusable objects (ID=4, 5, 6, 7) and two variable objects. The layout of objects is the same between the odd number pages, having the same reusable objects and different variable objects. However, some odd number pages may have variable objects of different size.

Similarly, even number pages have the same layout of objects, but have different variable objects. However, some even number pages may have variable objects of different size.

The assembler 14 merges an object raster in the order described in the layout information of FIG. 2 and generates a page raster.

More particularly, on the odd number pages, the reusable objects IDs 3, 2, 1 and the variable object ID 8 on page 1 (the variable object ID 11 on page 3) are merged in this order.

In addition, on the even pages, reusable object IDs 4, 5, the first variable object (ID 9 on page 2, and ID N on page M), the second variable object (ID 10 on page 2, ID N+1 on page M), reusable object IDs 6 and 7 are merged in this order.

As the object PS describes objects in the order of object IDs, an object raster is saved in the object cache 13 with the serial numbers output from the RIP 12 as object IDs.

FIG. 3 is a drawing indicating a concept when a page raster is generated by merging object rasters based on the sample layout information indicated in FIG. 2.

In FIG. 3, the left column indicates object rasters saved in the object cache 13, the center column indicates layout information generated in the VDP analyzer 11. More particularly, the layout information indicated in FIG. 3 includes page layouts 1, 2, 3, . . . M for the pages 1, 2, 3, . . . M corresponding to the sample shown in FIG. 2.

Figure 4:
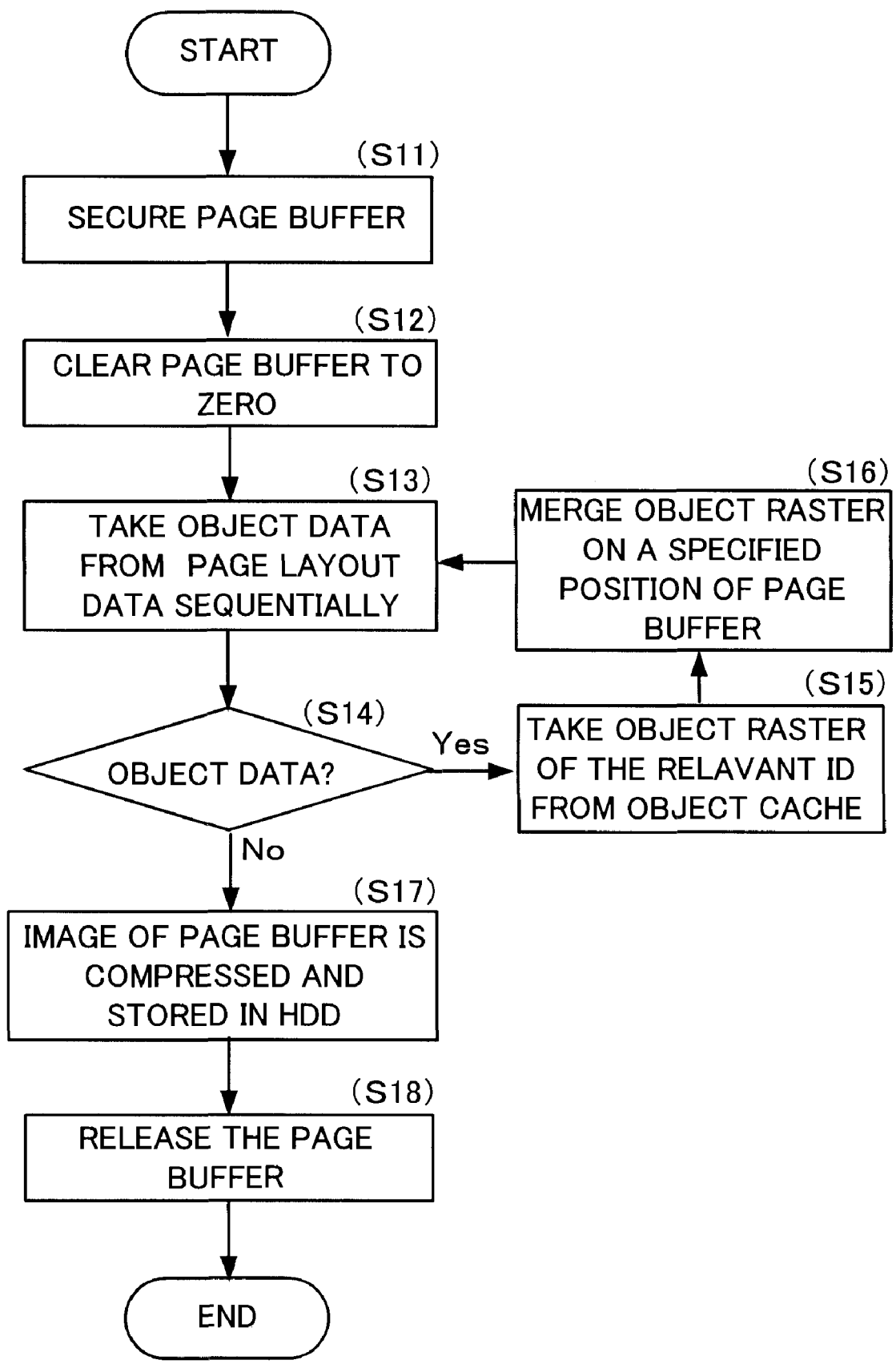
FIG. 4 is a flowchart indicating the outline of merging processing in the assembler.

Further, FIG. 4 is a flowchart indicating the outline of merging processing in the assembler 14.

The assembler 14 repeats assembling processing (generating a page raster by merging plural object rasters) by each page layout forming layout information, starting from the first page to the last page. Here, assembling processing is described referring to the first page as an example. It should be noted that each one page requires printing in four colors of C, M, Y, and K. The following procedure is performed for each of the four colors.

A memory area (a page buffer) for generating a page raster is secured (step S11).

The page buffer is cleared to zero (step S12).

The first object information is taken out from the first page layout information (object ID=3)(step S13).

In this case, as there is object information (object ID=3) (step S14: Yes), the object raster whose ID is 3 is taken out from the object cache 13 (step S15).

The object raster whose ID is 3 is merged at a position (X03, Y03) on a page buffer as a starting point (step S16).

Next object information is taken out from the first page layout information (object ID=2)(step S13).

As there is object information (object ID=2) (step S14: Yes), the object raster whose ID is 2 is taken out from the object cache 13 (step S15).

The object raster whose ID is 2 is merged at a position (X02, Y02) on the page buffer as a starting point (step S16).

Further, the next object information (object ID=1) is taken out from the object cache 13 (step S13).

As there is object information (object ID=1) (step S14: Yes), the object raster whose ID is 1 is taken out from the object cache 13 (step S15).

The object raster whose ID is 1 is merged at a position (X01, Y01) on the page buffer as a starting point (step S16).

Next object information is taken out from the first page layout information (object ID=8)(step S13).

As there is object information (object ID=8) (step S14: Yes), the object raster whose ID is 8 is taken out from the object cache 13 (step S15). The object raster whose ID is 8 is merged at a position (X08, Y08) on the page buffer as a starting point (step S16).

Again, next object information is to be taken out from the first page layout information (step S13). However, as there is no object information left, the processing goes to step S17.

The contents of the page buffer (completed page raster) is saved in a HDD 16 (step S17).

The page buffer is cleared (step S18).

Next, merge processing of an object raster will be described.

Figure 5:
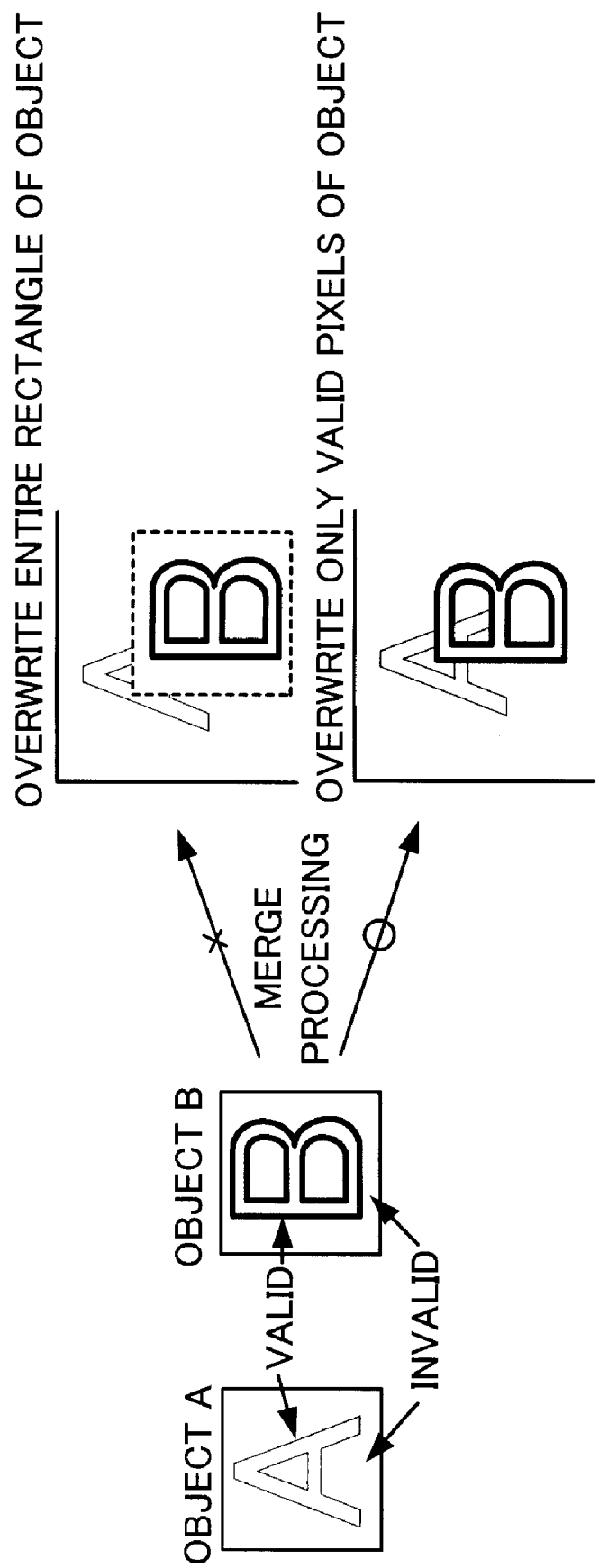
FIG. 5 is an illustration of merge processing of an object raster.

FIG. 5 is an illustration of merge processing of an object raster.

An object raster is a rectangular bitmap. However, the rectangular bitmap is not all valid and contains both an invalid region (pixels) and a valid region (pixels).

Merge processing is processing in which the valid pixels of an object raster are written over a page buffer and no action is taken for the invalid pixels.

An object raster is processed before being saved in an object cache in such a way that the pixel value≠0 indicates "validity" while the pixel value=0 indicates "invalidity." In other words, if an original pixel value=0 is valid, the object raster is processed to change the pixel value from 0 to 1 forcibly.

FIG. 5 indicates the state of a page buffer where the object raster of an object A is written on the page buffer and the object raster of an object B is written over the object A.

As shown in the right lower side of the drawing, processing of overwriting only valid pixels of the object is referred to as merge processing.

The merge processing, i.e., detecting valid pixels of the rectangular bitmap and arranging the valid pixels on a page buffer is heavy processing as it requires the heaviest usage of a CPU in the processing of an assembler.

On the other hand, processing indicated in the right upper side of FIG. 5 arranging (overwriting) all the pixels of the rectangular bitmap on the page buffer is very light, requiring almost no usage of a CPU.

This concludes the description the conventional variable print processing. Next, an embodiment of the present invention will be described.

Figure 6:
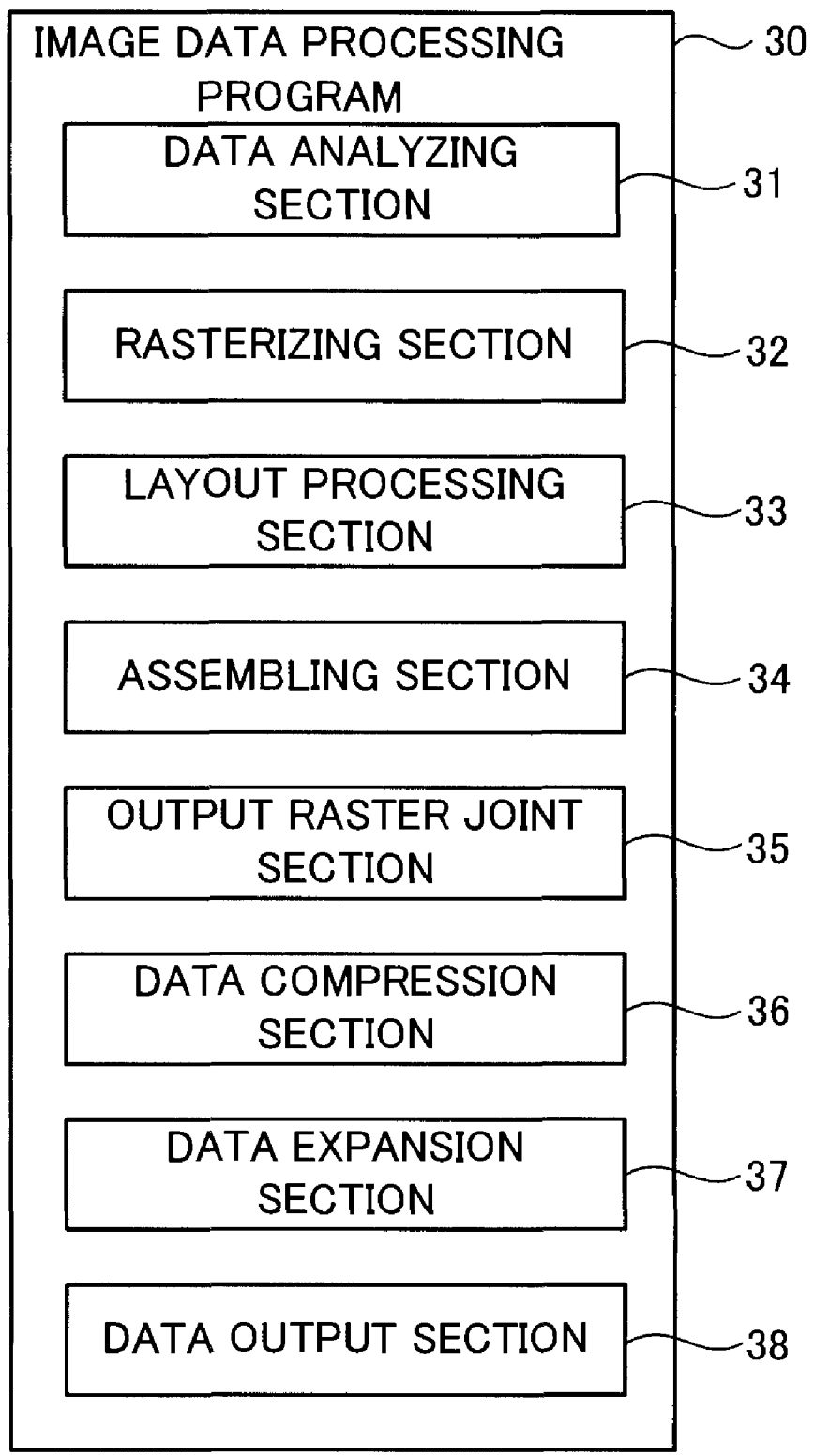
FIG. 6 indicates the outline of an image data processing program according to one embodiment of the present invention.

FIG. 6 indicates the outline of an image data processing program according to one embodiment of the present invention.

An image data processing program 30 indicated in FIG. 6 is formed by program elements including a data analyzing section 31, a rasterizing section 32, a layout processing section 33, an assembling section 34, an output raster joint region 35, a data compression section 36, a data expansion section 37 and a data output section 38.

Further, FIG. 7 is a functional block diagram of an image data processor realized in an information processing apparatus for executing a program such as a computer when the image data processing program 30 in FIG. 6 is executed in the information processing apparatus.

In other words, each element indicated in FIG. 7 is a function realized by a combination of the hardware of an information processing apparatus and program elements forming the image data processing program 30 indicated in FIG. 6 that are implemented in the information processing apparatus.

An image data processor 40 indicated in FIG. 7 has additional elements of a layout processing section 41 and an output raster joint section 42 compared with those provided in the conventional image data processor 10 in FIG. 1. Other elements of the image data processor 40 that respectively have the same functions as those of the corresponding elements of the conventional image data processor 10 are denoted by the same reference characters as the conventional image data processor 10 in FIG. 1.

The data analyzing section 31, which is a program element forming the image data processing program 30 indicated in FIG. 6, receives, when executed in an information processing apparatus, information specifying a reusable object that is an image object used repeatedly over plural pages, information specifying a variable object that is an image object used only once on a particular page, and page description data described in page description language for variable printing that describe arrangement positions on each page of image objects consisting of the reusable objects and variable objects. Then, the data analyzing section 31 generates object data formed by image objects specified by the page description data, and layout information for arrangement positions of the image objects specified by the page description data. In other words, the data analyzing section 31 is a program element that realizes a VDP analyzer 11 indicated in FIG. 7.

In addition, the rasterizing section 32 forming the image data processing program 30 receives, when executed in an information processing apparatus, object data generated in the data analyzing section 31 (VDP analyzer 11) and generates each object raster that is object data in a rasterized form of each image object. In other words, the rasterizing section 32 is a program element realizing a RIP 12 indicated in FIG. 7.

In addition, the layout processing section 33 forming the image data processing program 30, when executed in an information processing apparatus, generates, based on the layout information generated in the data analyzing section 31

(VDP analyzer 11), an one-page storage page layout for reusable objects describing the reusable object IDs to be arranged on that page and the arrangement positions of the reusable objects, by a group of a page where the same reusable objects are arranged respectively on the same positions. At the same time, the layout processing section 33 generates a storage page layout for each variable object describing the variable object ID, an image object ID arranged in a position overlapping the variable object at least partially, and information on how the image object overlaps the variable object. Consequently, the layout processing section 33 generates the entire storage layout information including the storage page layouts for reusable objects and the storage page layouts for variable objects. Further, for each output page for printing, the layout processing section 33 generates output page joint information describing the storage page layout IDs for reusable objects forming the output page, the storage page layout IDs for variable objects forming the output page, and arrangement positions of the variable objects on the output page specified by the storage page layout for the variable objects. Thus, the layout processing section 33 has a function of generating output joint information formed by output page joint information for all the pages. This layout processing section 33 is a program element realizing a layout processing section 41 indicated in FIG. 7.

Here, when the layout processing section 33 (layout processing section 41) generates a storage page layout for reusable objects for one page by the group based on the layout information generated in the data analyzing section 31 (VDP analyzer 11), the layout processing section 33 generates the storage page layout for reusable objects indicating the arrangement positions of the reusable objects on the storage page having the same size as the page forming the group. Further, the layout processing section 33 (layout processing section 41) generates, based on the layout information generated in the data analyzing section 31 (VDP analyzer 11), a storage page layout for each variable object indicating an arrangement position of an image object that overlaps the variable object at least partially, on the storage page having the same size as each variable object.

Further, the assembling section 34 forming the image data processing program 30, when executed in an information processing apparatus, assembles each object raster generated in the rasterizing section 32 (RIP12), based on the storage layout information generated in the layout processing section 33 (layout processing section 41) by each storage page layout forming the storage layout information. Thus, the assembling section 34 has a function of generating a storage page raster indicating a rasterized image by each storage page specified by each storage page layout. Here, data format of the storage layout information is the same as that of layout information generated in the data analyzing section 31. Thus, the assembler 14 indicated in FIG. 7 has the same function as the assembler 14 indicated in FIG. 1. The assembling section 34 is a program element realizing the assembler 14 indicated in FIG. 7.

Furthermore, the output raster joint section 35 forming the image data processing program 30, when executed in an information processing apparatus, joints storage page rasters generated in the assembling section 34 (assembler 14) based on output joint information by each output page joint information forming the output joint information. Thus, the output raster joint section 35 has a function of generating the output page raster representing a rasterized image, by each output page specified by each output joint information. In other words, the output raster joint section 35 is a program element realizing the output raster joint section 42 indicated in FIG. 7.

Furthermore, the data compression section 36, the data expansion section 37, and the data output section 38 forming the image data processing program 30 have the following functions when executed in an image processing apparatus: the data compression section 36 compresses storage page raster generated in the assembling section 34 (assembler 14); the data expansion section 37 expands the compressed storage page raster; and the data output section 38 outputs the output page raster generated in the output raster joint section 35 (the output raster joint section 42) to a printer device 20 for printing a visual image based on the output page raster. The data compression section 36, the data expansion section 37, and the data output section 38 are program elements respectively realizing the compression section 15, the expansion section 17, and the output control section 18.

In the following, each element constituting the image data processor 40 indicated in FIG. 7 will be described focusing on elements added to those of the conventional image data processor 10 indicated in FIG. 1.

Also in the present embodiment, descriptions will be made referring to the sample of the layout information indicated in FIG. 2.

In this embodiment, different layout patterns of reusable objects are extracted by the page, and storage page rasters where only the reusable objects are assembled are generated for the different patterns, compressed and saved in the HDD 16. In the case of the sample indicated in FIG. 2, there are two different patterns of an odd-number page pattern (the first-page storage page raster) and an even-number page pattern (the second-page storage page raster)(cf. FIG. 14).

Further, a storage page raster where a reusable object crossing the region of a variable object and the variable object are assembled are generated for each page, compressed and stored in the HDD 16. In the case of the sample in FIG. 2, for the reusable object ID2 crossing the region of the variable object ID8 on the first page, a storage page raster where ID8 is arranged over ID2 (the third page storage page raster) is generated. For the reusable object ID6 crossing the region of the variable object ID9 on the second page, a storage page raster where ID6 is arranged over ID9 is generated (the fourth page storage page raster). For the reusable object ID7 crossing the region of the variable object ID10 on the page 2, a storage page raster where ID 7 is arranged over ID10 is generated (the fifth storage page raster) (cf. FIG. 14).

When outputting in a printer, a storage page raster is retrieved from the HDD 16 and is expanded. In the case of the first page, the third-page storage page raster is written over at the certain position of the first-page storage page raster. In the case of the second page, the fourth-page and fifth-page storage page rasters are written over at the certain position of the second storage page raster. Then, generated output page rasters are sent to the printer device 20.

In order to realize the above processing, each element performs the following processing.

The layout processing section 41 generates storage layout information and output joint information based on layout information. The output joint information is stored in the HDD 16. The storage layout information is saved temporarily in a memory or the HDD 16.

The assembler 14 merges object rasters based on the storage layout information and generates a storage page raster. The image of the generated storage page raster is compressed in the compression section 15 and saved in the HDD 16.

The storage page raster stored in the HDD 16 is retrieved, and expanded in the expansion section 17, and then sent to the output raster joint section 42. The output raster joint section 42 performs raster-joint operation (overwrites) the storage page rasters based on the output joint information and generates an output page raster. The output page raster is output to the printer device 20 via the output control section 18.

Hereafter, the layout processing section 41 and the output raster joint section 42 that are elements different from the conventional technique will be described.

Here, intermediate data handled by the layout processing section 41 and data generated by the layout processing section 41 are defined as follows.

Among storage page layouts constituting storage layout information, a layout formed by only reusable objects is referred to as "a reusable layout" and a list of "the reusable layout" is referred to as "a list of reusable layout."

Storage layout information has the same structure as that of layout information, and is formed by a list of the layout information by page for storage. The storage layout information is one of data input to the assembler 14. The assembler 14 generates a storage page raster to be saved in the HDD 16 based on the storage layout information.

The output joint information also has the same structure as that of layout information, and is formed by a list of the layout information by page for output. However, page layout information of the output joint information describes page numbers of storage page rasters, not object IDs. Other description items such as the size of output page to be generated and arrangement positions of storage page rasters are the same as layout information.

Figure 8A:
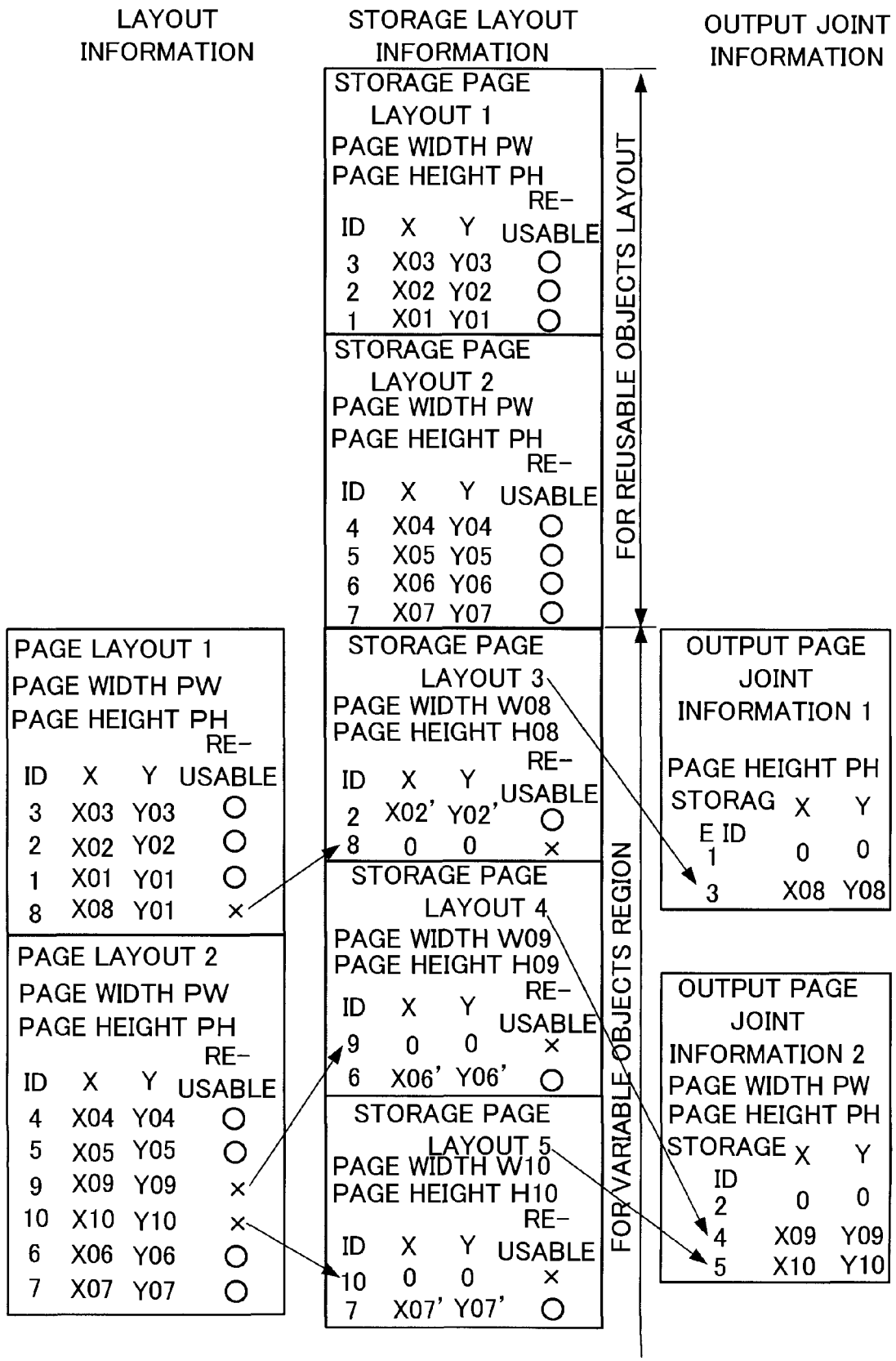
FIG. 8 illustrates correspondence between layout information, storage layout information and output joint information.
Figure 8B:
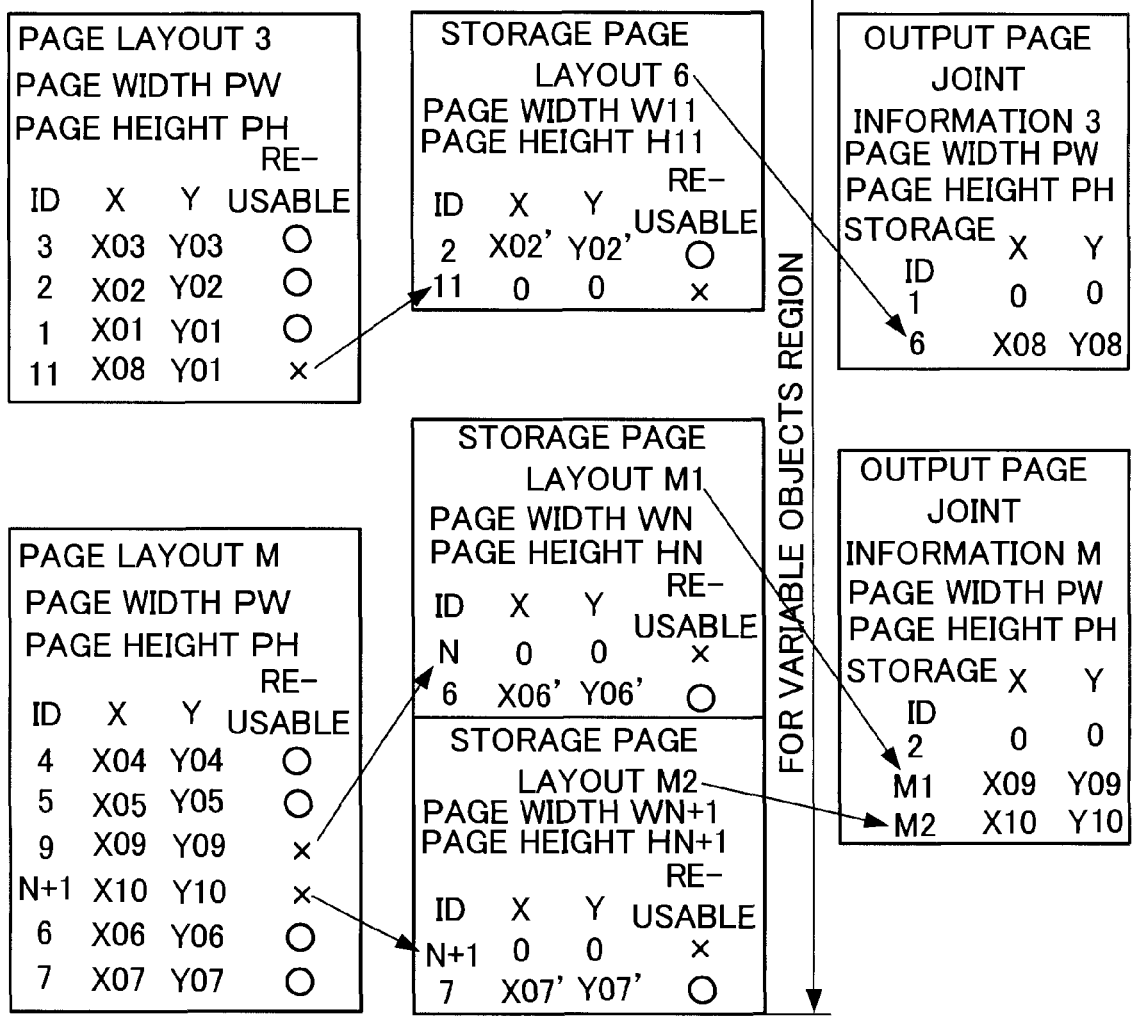

FIG. 8 illustrates correspondence between layout information, storage layout information and output joint information.

The layout information (the left column) indicated in FIG. 8 that is based on the sample in FIG. 2 is same as the layout information indicated in FIG. 3.

Figure 9:
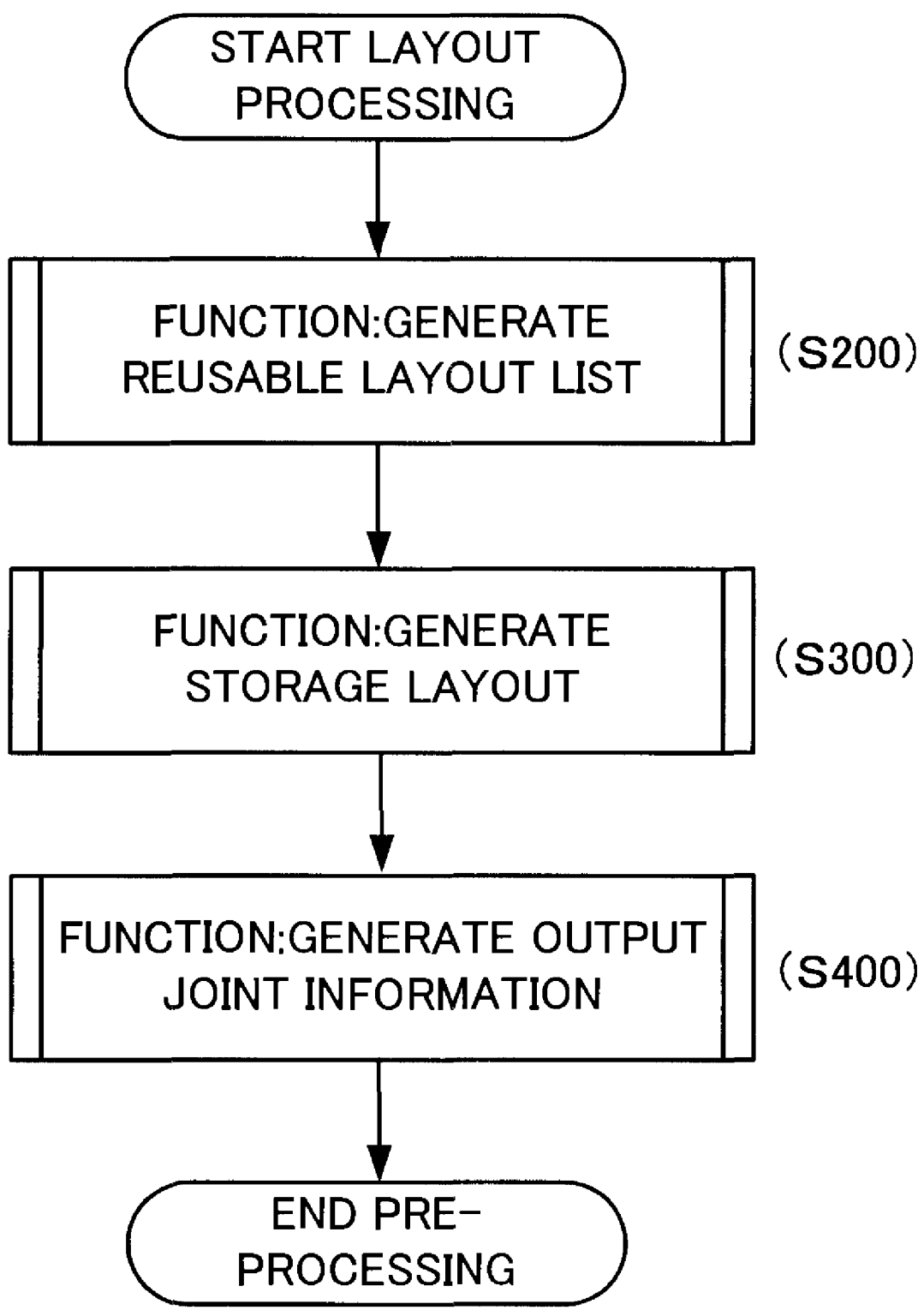
FIG. 9 is a flowchart indicating a processing procedure in a layout processing section.

FIG. 9 is a flowchart indicating a processing procedure in the layout processing section 41.

In the layout processing section 41, generation of a reusable layout list (step S200), generation of storage layout information (step S300) and generation of output joint information (step S400) are performed.

Figure 10:
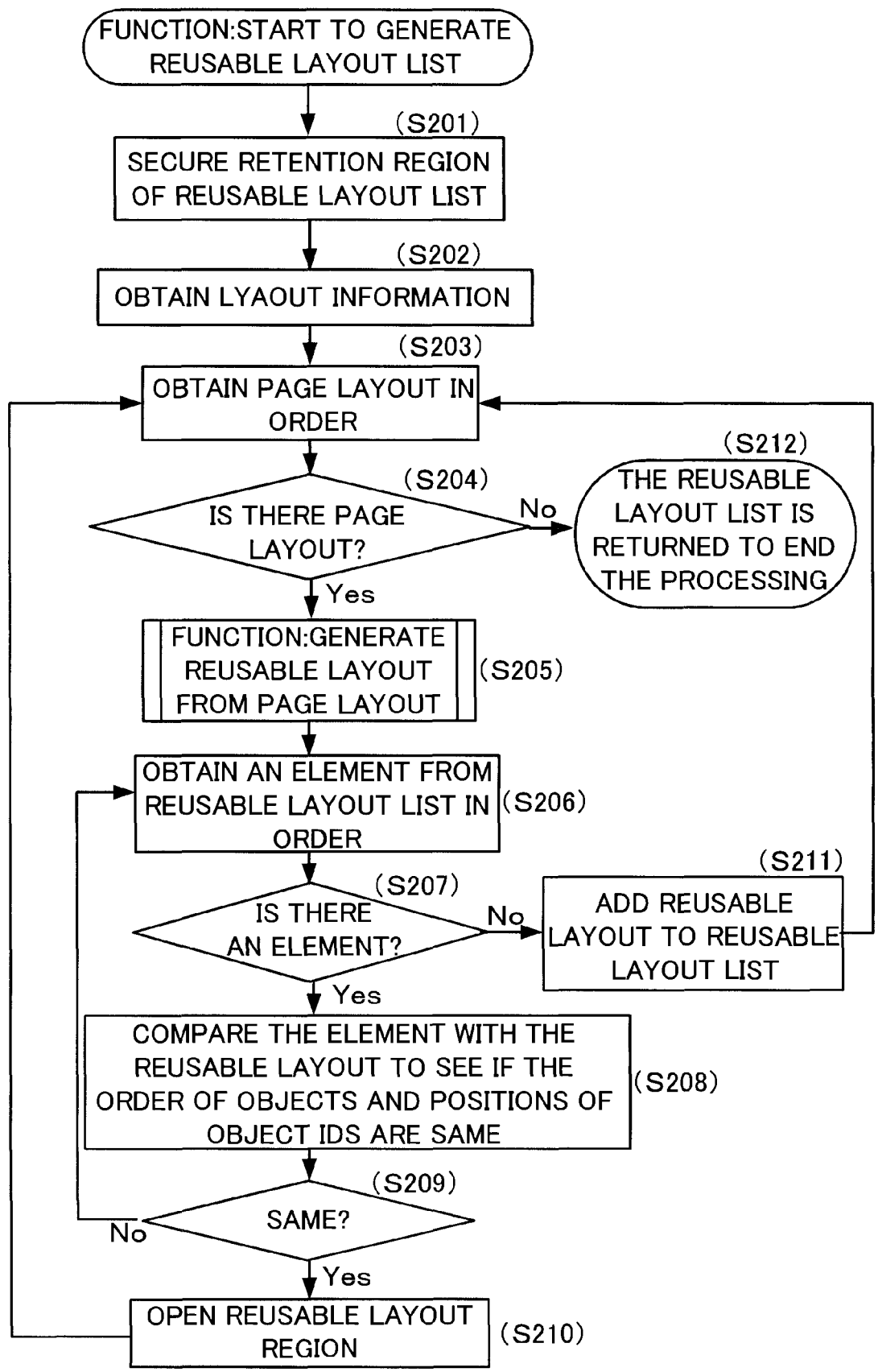
FIG. 10 is a flowchart indicating a procedure for generation of a reusable layout list (step S200) that is one of processing performed in the layout processing section.

FIG. 10 is a flowchart indicating a procedure for generation of a reusable layout list (step S200) that is one of processing performed in the layout processing section 41.

When the processing in FIG. 10 is performed, "a reusable layout list" that is a base for storage page layouts 1 and 2 among storage layout information in FIG. 8 will be generated.

In the processing indicated in FIG. 10, at first a retention region for a reusable layout list is secured (step S201); layout information in FIG. 8 is acquired (step S202); a page layout constituting layout information is acquired one by one in order (step S203); and the following processing is performed.

When there is an unprocessed page layout (step S204: Yes), a reusable layout is generated from a page layout (step S205).

FIG. 11 is a flowchart indicating a processing for generating a reusable layout from a page layout in step S205 of FIG. 10.

Here, a retention region for a reusable layout is secured (step S2051); object information is acquired from a page layout sequentially (step S2052); if there is an unprocessed object (step S2053: Yes), it is judged whether or not the object is a reusable object (step S2054); If the object is a reusable object (step S2054: Yes), the object information of the reusable object is recorded in the reusable layout (step S2055); and return to step S2052. If the object is not a reusable object (step S2054: No), the procedure returns to step S2052 without doing anything about the object.

When there is no unprocessed object on a currently-processing page layout (step S2053: No) the reusable layout that was finally generated for the current page layout in step S2055 is returned to the processing in FIG. 10 and processing of FIG. 11 is finished (step S2056).

Description will continue referring back to FIG. 10.

After the processing in FIG. 11, i.e., generation of a reusable layout in step S205 of FIG. 10, an element (one reusable layout) is obtained sequentially from the reusable layout list that is a list of the reusable layouts that have been generated through the processing (step S206). If there is an element obtained (step S207: Yes), the reusable layout generated in step S205 is compared with the element obtained from reusable layout list and it is judged if order of objects, each object ID, and arrangement positions are the same (step S208). If they are different (step S209: No), the procedure goes back to step S206 and the next element is retrieved to repeat the comparison. This retrieval of an element is repeated until there is no element to be retrieved from the reusable layout list (step S207: No). If there is no element left, it means that the reusable layout list does not have the same object, the element of the same arrangement position as the reusable layout generated in step S205 this time. In this case, the reusable layout generated in step S205 is added to the reusable layout list (step S211) and the processing of the next page layout is started (step S203). On the other hand, if the reusable layout list has an element of the same object and the same arrangement position as the reusable layout generated in step S205 (step S209: Yes), the reusable layout is not added to the reusable layout list and a reusable layout region is released (step S210) and the processing of the next page layout (step S203) is started.

By the processing described in FIG. 10, it is possible to generate a reusable layout list that has the element of one reusable layout by a page group of the same object and the same arrangement position about reusable objects.

Figure 12A:
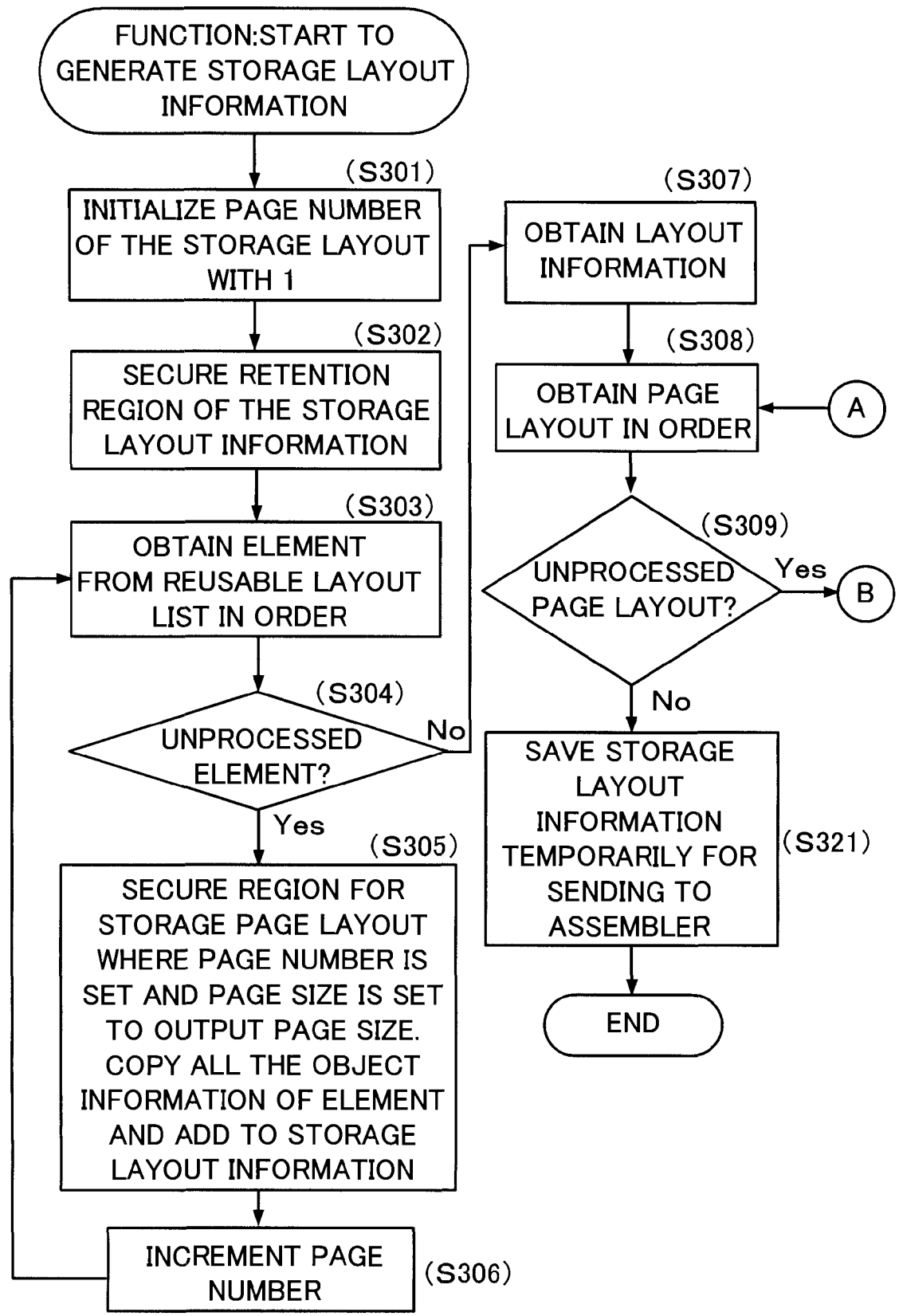
FIG. 12 is a flowchart indicating a procedure of generating storage layout information that is one of processing performed in the layout processing section.
Figure 12B:
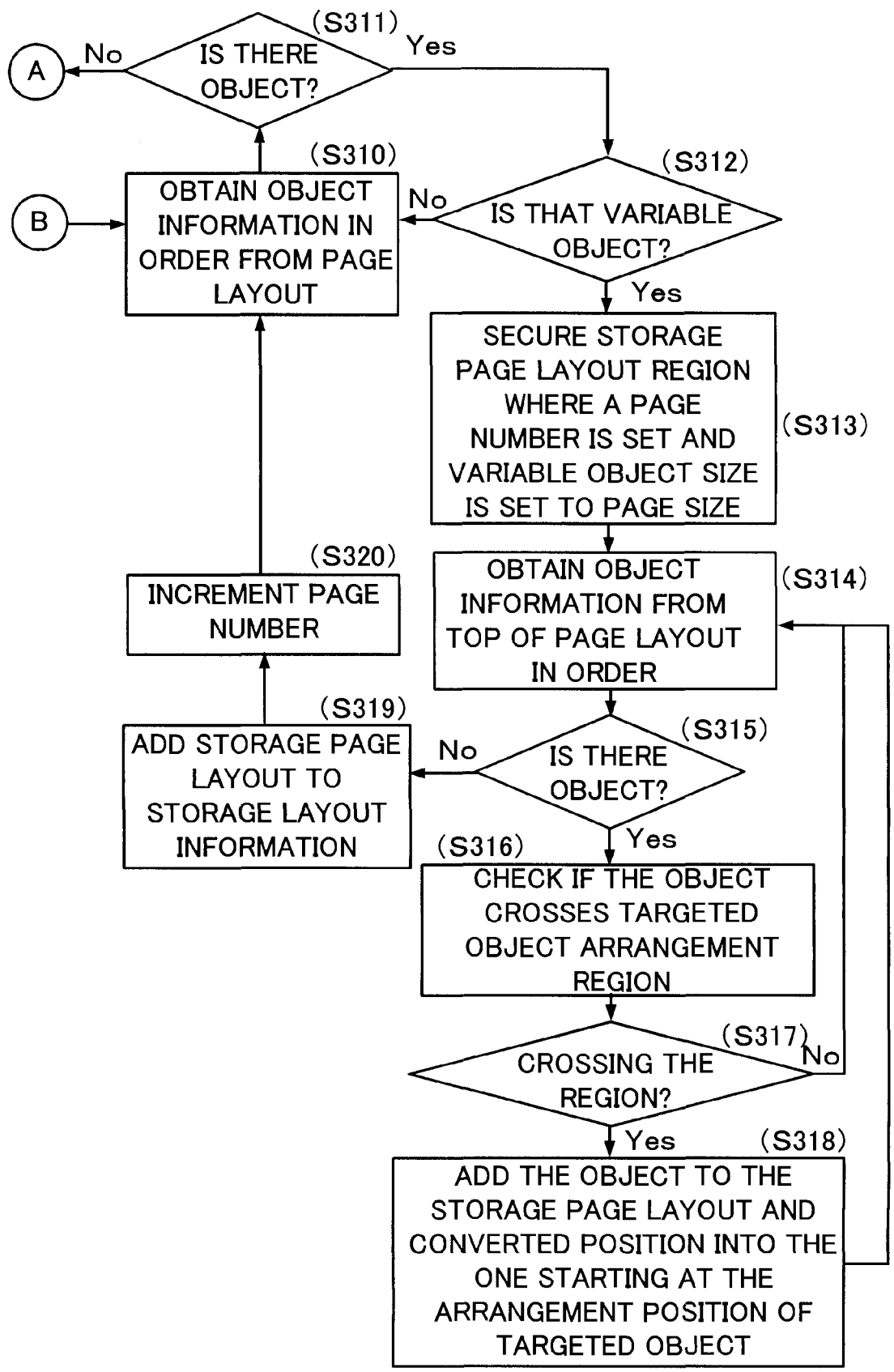

FIG. 12 is a flowchart indicating a procedure of generating storage layout information (step S300) in FIG. 9 that is one of processing performed in the layout processing section 41.

Here, at first, the page number of a storage layout is initialized with 1 (step S301) and a retention region of storage layout information is secured (step S302). Then, an element (reusable layout) is obtained from a list of reusable layouts sequentially (step S303). If an unprocessed element is obtained in step S303 (step S304: Yes), the region for a storage page layout is secured where a page number is set and the size of the page is set to the size of an output page and all the object information of the element (reusable layout) is copied to be added to storage layout information (step S305). Furthermore, the page number is incremented (step S306) and processing of the next element (reusable layout) is started. When there is no unprocessed element (reusable layout) in the reusable layout list (step S304: No), the processing goes to step S307.

At this stage, in the case of the sample in FIG. 2, the storage page layouts 1 and 2 for reusable layout among the storage layout information indicated in FIG. 8 are generated.

In step S307, the layout information (the left column of FIG. 8) is obtained, and further a page layout constituting the layout information is obtained (step S308). If there is a page layout to be processed (step S309: Yes), object information is obtained in order from the page layout for one page (step S310). If there is an object (step S311: Yes), it is judged whether the object is a variable object or not (step S312). Here, as the processing is targeted for a variable object, if the object is not a variable object (but is a reusable object) (Step S312: No), the procedure goes back to step S310 to obtain the next object information from the same page layout.

On the other hand, if the object is a variable object (step S312: Yes), a storage page layout region is secured where a page number is set and the size of the variable object is set to the page size (step S313). Here, a variable object targeted this time is referred to as "a focused object." Again, from the top of the same page layout, object information is obtained in order (step S314). If there is an object (step S315: Yes), it is judged if the object (obtained in step S314) at least partially crosses the region for arranging the targeted variable object (the focused object obtained in step S310 and judged to be a variable object in step S312) (step S316). If the object crosses the region (step S317: Yes), the object (obtained in step S314) is added to the storage page layout of the current focused object. When added, the position of the object is converted into the one starting at the arrangement position of the current focused object (step S318). Subsequently, returning back to step S314, processing of the next object is started.

When there is no unprocessed object left in the page layout (step S315: No), the storage page layout that has been generated for one variable object (focused object) through the processing is added to the storage layout information (step S319). Then, the page number is incremented (step S320) and processing of the next focused object (step S310) is started. When there is no unprocessed object left in the page layout (step S311: No), the procedure goes to processing of the next page layout (step S308).

Furthermore, when there is no page layout to be processed (step S309: No), the storage layout information is saved temporarily in order to be sent to the assembler 14 (cf. FIG. 7) (step S321). This concludes the processing of generating the storage layout information in FIG. 12.

In the case of the sample in FIG. 2, storage layout information formed by all the storage page layouts in FIG. 8 is generated at this stage.

Figure 13A:
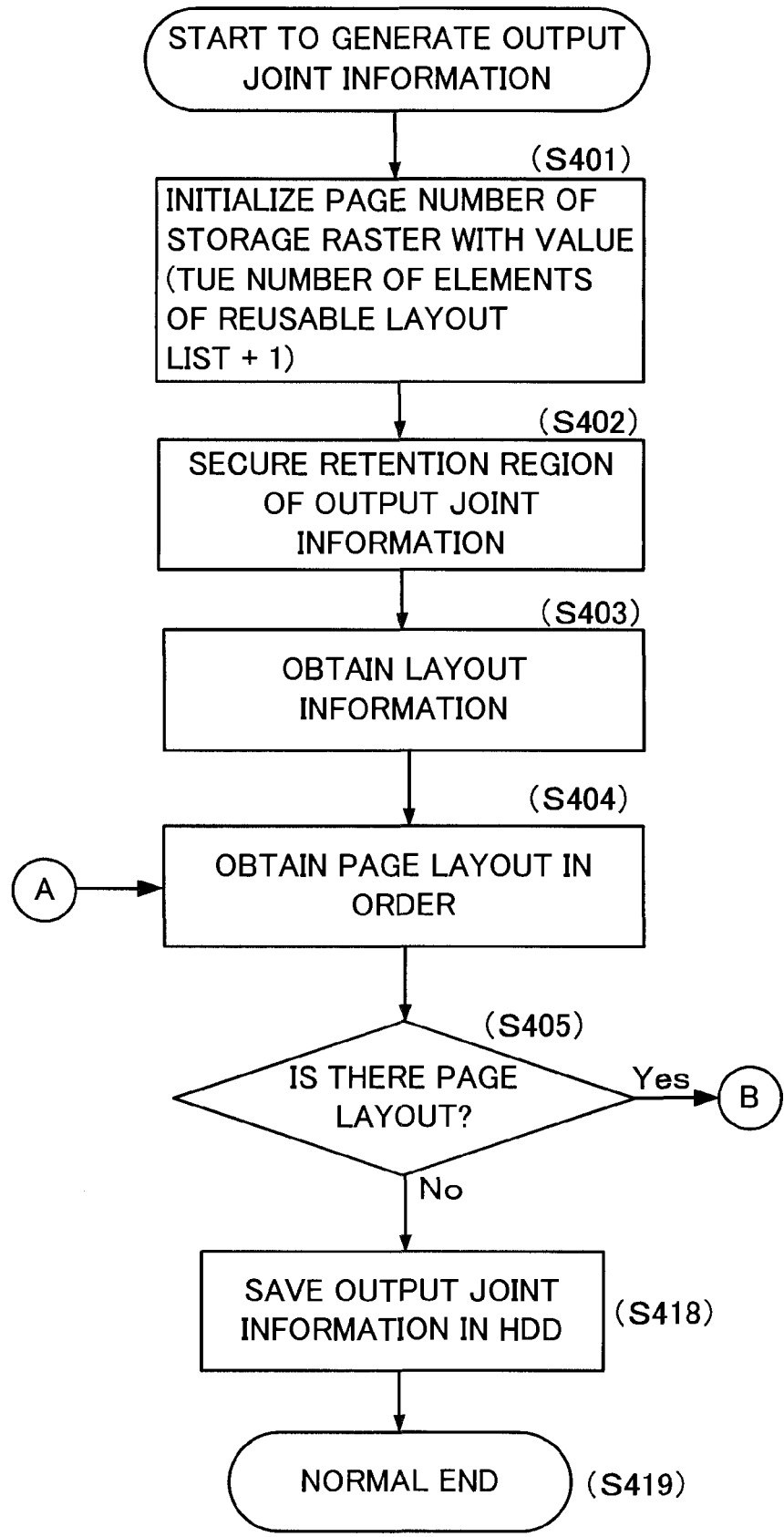
FIG. 13 is a flowchart indicating a procedure of generating output joint information that is one of the processing performed in the layout processing section.
Figure 13B:
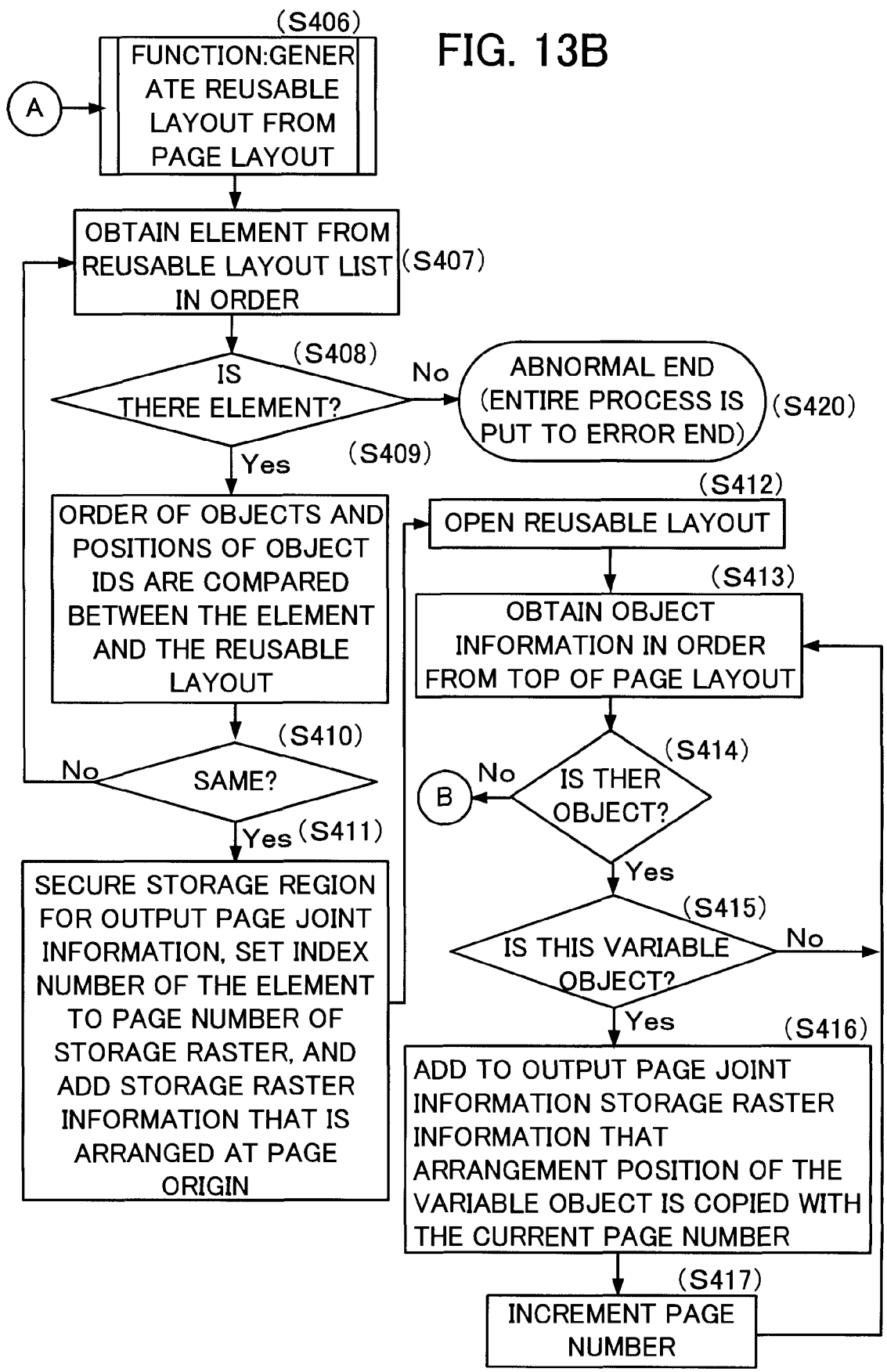

FIG. 13 is a flowchart indicating a procedure of generating output joint information (step S400) indicated in FIG. 9 that is one of the processing performed in the layout processing section 41 (cf. FIG. 7).

At first, the page number of a storage raster is initialized with a value of "the number of elements of the reusable layout list+1" (S401). In the case of the sample indicated in FIG. 8, the page number of the storage raster is initialized with page number 3. Subsequently, a retention region of output joint information is secured (step S402) and layout information is obtained (step S403) A page layout constituting the layout information is obtained sequentially (step S404). If there is a page layout (step S405: Yes), a reusable layout is generated from the page layout (step S406). This processing of generating a reusable layout in step S406 is the same as the one in step S205 indicated in FIG. 10, which is described referring to FIG. 11. Thus, detailed descriptions of the processing in step S406 is omitted here.

When a reusable layout is generated in step S406, an element (a reusable layout) is obtained sequentially from the reusable layout list which has been generated in the process of generating the reusable layout list indicated in FIG. 10 (step S407), and when there is an element (step S408: Yes), the order of the objects and arrangement positions of the respective object IDs are compared between the element of the reusable layout list and the reusable layout generated in step S406 (step S409). When they are not the same (step S410: No), the next element is obtained from the reusable layout list (step S407), and the comparison processing is repeated (step S409).

It should be noted here that the reusable layout list referred to in the above processing is the one generated in the processing indicated in FIG. 10, and if the processing in FIG. 10 is normal, it should be judged that there is an element in step S408. However, If by any chance it is judged that there is not an element, the entire processing is brought to an error end (step S420).

When the element same as the reusable layout generated in step S406 is found (step S410: Yes), a storage region for output page joint information is secured, an index number of the element is set to the page number of a storage raster, and storage raster information having an arrangement position at a page origin is added (step S411), and the reusable layout region is released (step S412). At this stage, the IDs of the storage page layout formed by only the reusable objects are recorded in the output page joint information. For example, referring to the first-page output page joint information 1 constituting output joint information indicated in FIG. 8, storage ID=1 is recorded in this output page joint information 1.

Next, object information is obtained in order from the top of the page layout acquired in step S404 (step S413). When there is an object (step S414: Yes), it is judged whether the object is a variable object (step S415). When the object is a variable object (step S415: Yes), storage raster information in which the arrangement position of the variable object is copied with the current page number unchanged is added to the output page joint information (Step S416). Then, the page number is incremented (step S417) and the processing goes back to step S413 and processing of the next object arranged on the same page layout is started.

When there is no unprocessed object left in the page layout (step S414: No), the processing goes back to step S404 and processing of the next page layout is started. At this stage, output page joint information for one page that has been generated is completed.

When processing of all the page layouts are finished (step S405: No), the output joint information is saved in the HDD 16 (step S418) to end the processing normally (step S419).

In this way, in the layout processing section 41 indicated in FIG. 7, storage layout information and output joint information are generated based on layout information.

Figure 14A:
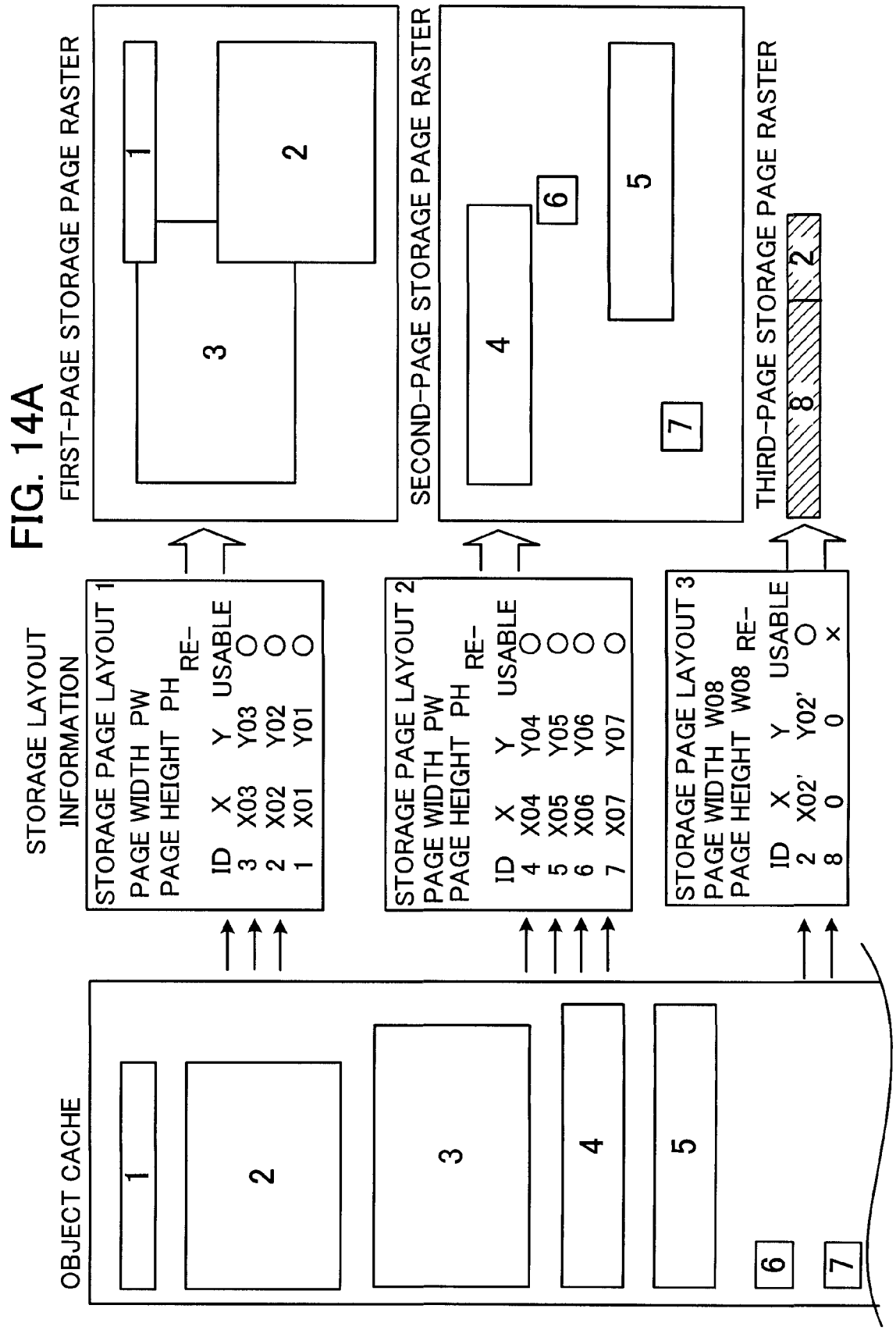
FIG. 14 illustrates the outline of processing performed in the assembler.
Figure 14B:
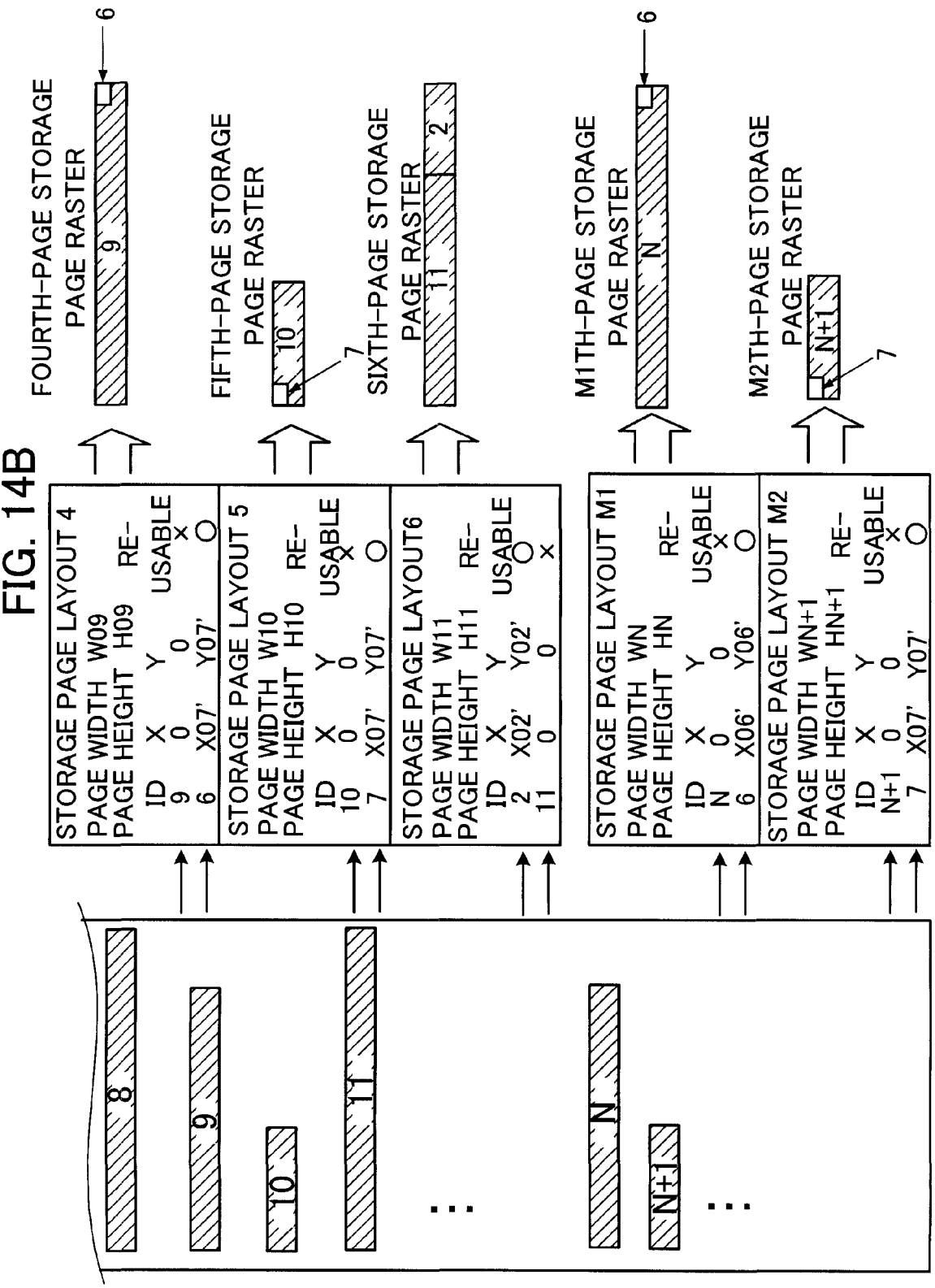

FIG. 14 illustrates the outline of processing performed in the assembler 14.

Unlike the conventional assembler, processing in the assembler 14 is based on the storage layout information instead of layout information. However, as there is no difference in the structure (a format) between layout information and storage layout information, the processing in the assembler is similar to the conventional technique. Thus, the detailed description is omitted. Referring to FIG. 14, the sample indicated in the embodiment (in FIG. 2, FIG. 3, and FIG. 8) will be described.

The object raster of reusable objects (ID=1-7) and the variable objects (ID=8 or larger) is stored in an object cache in the left column of FIG. 14.

The assembler 14 refers to storage layout information and "merges" an object raster for each storage page layout forming the storage layout information and generates a storage page raster.

Here, the first-page and the second-page storage page are formed by only reusable objects having the same size as the original page.

On the third-page storage raster and each storage raster thereafter, the size of each page is equivalent to the size of each variable object (focused object) and each storage page raster is formed by merging the variable object (focused object) and an object crossing (overlapping) the variable object.

In this way, as a storage page raster is generated by a group having the same reusable objects in the same arrangement positions, date amount is reduced significantly. In addition, as the merge processing of variable objects is performed at this stage, the merge processing at the stage of outputting is not necessary. Thus, high-speed processing is enabled.

The storage page raster generated in this way is compressed in the compression section 15 and saved in the HDD 16.

Figure 15A:
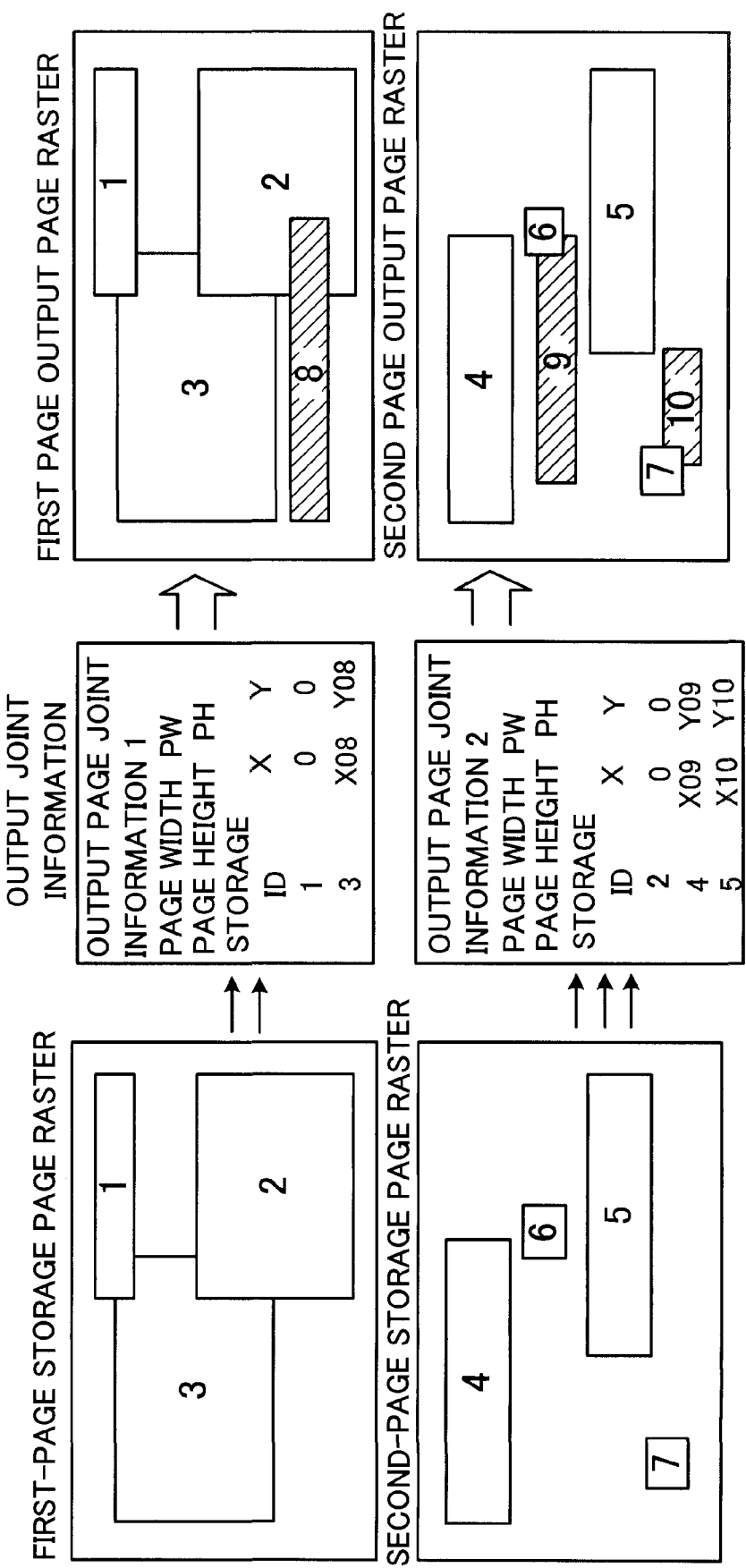
FIG. 15 illustrates the outline of processing performed in an expansion section, an output raster joint section, and an output control section.
Figure 15B:
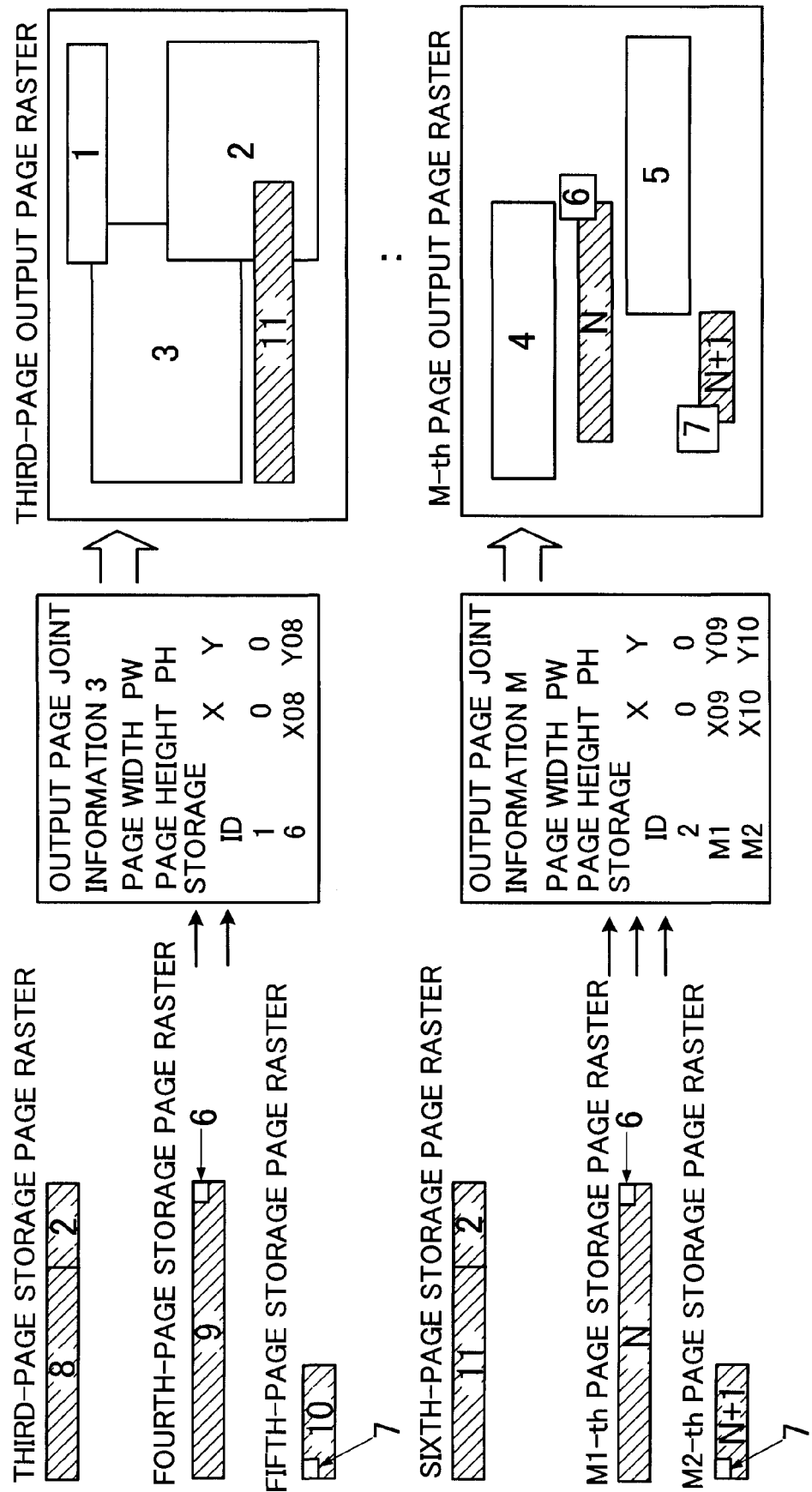
Figure 16:
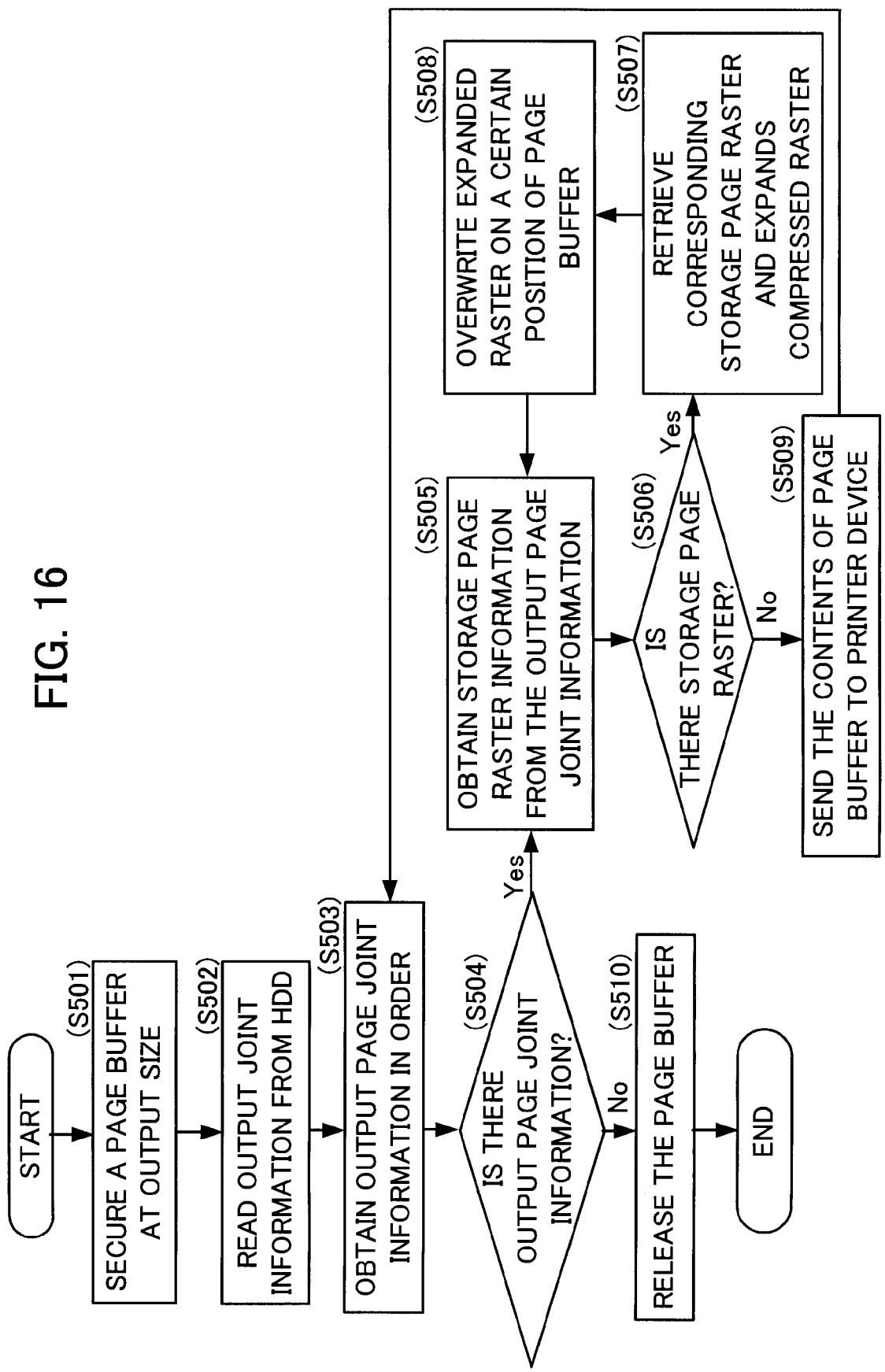
FIG. 16 is a flowchart representing the processing performed in the output raster joint section.

FIG. 15 illustrates the outline of processing performed in the expansion section 17, the output raster joint section 42, and the output control section 18. FIG. 16 is a flowchart representing the processing performed in the output raster joint section 42.

At first, a page buffer of output size is secured (step S501), output joint information is retrieved from the HDD 16 (step S502), output page joint information forming the output joint information is obtained in order for each page (step S503). When there is unprocessed output page joint information (step S504: Yes), storage page raster information is obtained sequentially from the output page joint information (step S505). When there is unprocessed storage page raster information (step S506: Yes), the corresponding storage page raster is retrieved from the HDD 16 and expanded (step S507) The expanded storage page raster is written over at a specified position on the page buffer (step S508). This procedure is repeated until there is no unprocessed storage page raster information is left in the output page joint information (step S506: No). Then, the contents of the page buffer is sent to the printer device 20 (step S509) and processing of the next output page joint information is started (step S503).

When there is no unprocessed output page joint information (step S504: No), the page buffer is cleared (step S510) to finish the processing.

Here, it should be noted that the processing of "overwriting" in step S508 is not a merging processing (processing indicated in the lower right of FIG. 5), but a simple processing of overwriting (processing indicated in the upper right of FIG. 5). Thus, high-speed processing is enabled.

What is claimed is:

1. An image data processor comprising:
    a data analyzing section that receives information specifying a reusable object that is an image object used repeatedly over a plurality of pages, information specifying a variable object that is an image object used once on a particular page, and page description data in page description language describing arrangement positions of image objects by each page formed by the reusable object and the variable object, and that generates object data having image objects specified by the page description data, and layout information having arrangement positions by each page of the image objects specified by the page description data;
    a rasterizing section that receives the object data generated in the data analyzing section and rasterizes each image object in the object data, thereby generates an object raster that is object data in a rasterized format of each image object;
    a layout processing section that generates, based on the layout information generated in the data analyzing section, a storage page layout for reusable objects for one page by a group of a page where same reusable objects are arranged respectively on same positions, the storage page layout for reusable objects describing IDs of the reusable objects to be arranged on the page and arrangement positions of the reusable objects, generates a storage page layout for each variable object describing an ID of the variable object and an ID of an image object overlapping the variable object at least partially, and a manner in which the image object overlaps the variable object, and thereby generates storage layout information formed by all storage page layouts including the storage page layout for reusable objects and the storage page layout for the variable object, and further generates, for each output page for printing, output page joint information describing an ID of a storage page layout for reusable objects forming the output page, an ID of a storage page layout for the variable object forming the output page, and an arrangement position of the variable object on the output page specified by the storage page layout for the variable object, thereby generating output joint information formed by output page joint information for all the output pages;
    an assembling section that assembles each object raster generated in the rasterizing section, based on the storage layout information generated in the layout processing section, by each storage page layout forming the storage layout information, thereby generating a storage page raster representing a rasterized image by each storage page specified by each storage page layout; and
    an output raster joint section that joints storage page rasters generated in the assembling section, based on the output joint information by each output page joint information forming the output joint information, thereby generating an output page raster representing a rasterized image by each output page specified by each output page joint information.

2. The image data processor according to claim 1, further comprising:
    a data compression section that performs compression processing to a storage page raster generated in the assembling section; and
    a data expansion section that performs expansion processing to the compressed storage page raster.

3. The image data processor according to claim 2, further comprising a data output section that outputs the output page raster generated in the output raster joint section to a printer that prints a visual image based on the output page raster.

4. The image data processor according to claim 2, wherein when the layout processing section generates a storage page layout for reusable objects for one page by the group based on the layout information generated in the data analyzing section, the layout processing section generates a storage page layout for reusable objects representing arrangement positions of the reusable objects on a storage page having the same size as the page forming the group.

5. The image data processor according to claim 2, wherein the layout processing section generates for each variable object, based on the layout information generated in the data analyzing section, a storage page layout for the variable object representing an arrangement position of an image object that overlaps the variable object at least partially on the storage page having the same size as each variable object.

6. The image data processor according to claim 1, further comprising a data output section that outputs the output page raster generated in the output raster joint section to a printer that prints a visual image based on the output page raster.

7. The image data processor according to claim 6, wherein when the layout processing section generates a storage page layout for reusable objects for one page by the group based on the layout information generated in the data analyzing section, the layout processing section generates a storage page layout for reusable objects representing arrangement positions of the reusable objects on a storage page having the same size as the page forming the group.

8. The image data processor according to claim 6, wherein the layout processing section generates for each variable object, based on the layout information generated in the data analyzing section, a storage page layout for the variable object representing an arrangement position of an image object that overlaps the variable object at least partially on the storage page having the same size as each variable object.

9. The image data processor according to claim 1, wherein when the layout processing section generates a storage page layout for reusable objects for one page by the group based on the layout information generated in the data analyzing section, the layout processing section generates a storage page layout for reusable objects representing arrangement positions of the reusable objects on a storage page having the same size as the page forming the group.

10. The image data processor according to claim 1, wherein the layout processing section generates for each variable object, based on the layout information generated in the data analyzing section, a storage page layout for the variable object representing an arrangement position of an image object that overlaps the variable object at least partially on the storage page having the same size as each variable object.

11. A non-statutory image data processing program storage medium storing an image data processing program, which is executed an information processing apparatus and causes the information processing apparatus to operate as an image data processor, the image data processor comprising:

a data analyzing section that receives information specifying a reusable object that is an image object used repeatedly over a plurality of pages, information specifying a variable object that is an image object used once on a particular page, and page description data in page description language describing arrangement positions of image objects by each page formed by the reusable object and the variable object, and that generates object data having image objects specified by the page description data, and layout information having arrangement positions by each page of the image objects specified by the page description data;

a rasterizing section that receives the object data generated in the data analyzing section and rasterizes each image object in the object data, thereby generates an object raster that is object data in a rasterized format of each image object;

a layout processing section that generates, based on the layout information generated in the data analyzing section, a storage page layout for reusable objects for one page by a group of a page where same reusable objects are arranged respectively on same positions, the storage page layout for reusable objects describing IDs of the reusable objects to be arranged on the page and arrangement positions of the reusable objects, generates a storage page layout for each variable object describing an ID of the variable object and an ID of an image object overlapping the variable object at least partially, and a manner in which the image object overlaps the variable object, and thereby generates storage layout information formed by all storage page layouts including the storage page layout for reusable objects and the storage page layout for the variable object, and further generates, for each output page for printing, output page joint information describing an ID of a storage page layout for reusable objects forming the output page, an ID of a storage page layout for the variable object forming the output page, and an arrangement position of the variable object on the output page specified by the storage page layout for the variable object, thereby generating output joint information formed by output page joint information for all the output pages;

an assembling section that assembles each object raster generated in the rasterizing section, based on the storage layout information generated in the layout processing section, by each storage page layout forming the storage layout information, thereby generating a storage page raster representing a rasterized image by each storage page specified by each storage page layout; and an output raster joint section that joints storage page rasters generated in the assembling section based on the output joint information by each output page joint information forming the output joint information, thereby generating an output page raster representing a rasterized image by each output page specified by each output page joint information.

12. The image data processing program storage medium according to claim 11, the image data processing program stored in the medium further causing the information processing apparatus to comprise:

a data compression section that performs compression processing to a storage page raster generated in the assembling section; and a data expansion section that performs expansion processing to the compressed storage page raster.

13. The image data processing program storage medium according to claim 12, the image data processing program stored in the medium further causing the information processing apparatus to comprise a data output section that outputs the output page raster generated in the output raster joint section to a printer that prints a visual image based on the output page raster.

14. The image data processing program storage medium according to claim 12, wherein when the layout processing section generates a storage page layout for reusable objects for one page by the group based on the layout information generated in the data analyzing section, the layout processing section generates a storage page layout for reusable objects representing arrangement positions of the reusable objects on a storage page having the same size as the page forming the group.

15. The image data processing program storage medium according to claim 12, wherein the layout processing section generates for each variable object, based on the layout information generated in the data analyzing section, a storage page layout for the variable object representing an arrangement position of an image object that overlaps the variable object at least partially on the storage page having the same size as each variable object.

16. The image data processing program storage medium according to claim 11, the image data processing program stored in the medium further causing the information processing apparatus to comprise a data output section that outputs the output page raster generated in the output raster joint section to a printer that prints a visual image based on the output page raster.

17. The image data processing program storage medium according to claim 16, wherein when the layout processing section generates a storage page layout for reusable objects for one page by the group based on the layout information generated in the data analyzing section, the layout processing section generates a storage page layout for reusable objects representing arrangement positions of the reusable objects on a storage page having the same size as the page forming the group.

18. The image data processing program storage medium according to claim 16, wherein the layout processing section generates for each variable object, based on the layout information generated in the data analyzing section, a storage page layout for the variable object representing an arrangement position of an image object that overlaps the variable object at least partially on the storage page having the same size as each variable object.

19. The image data processing program storage medium according to claim 11, wherein when the layout processing section generates a storage page layout for reusable objects for one page by the group based on the layout information generated in the data analyzing section, the layout processing section generates a storage page layout for reusable objects representing arrangement positions of the reusable objects on a storage page having the same size as the page forming the group.

20. The image data processing program storage medium according to claim 11, wherein the layout processing section generates for each variable object, based on the layout information generated in the data analyzing section, a storage page layout for the variable object representing an arrangement position of an image object that overlaps the variable object at least partially on the storage page having the same size as each variable object.

* * * * *